(12) United States Patent
Azuma

(10) Patent No.: US 7,743,135 B2
(45) Date of Patent: Jun. 22, 2010

(54) DISPLAY-SCREEN-SHARING SYSTEM, DISPLAY-SCREEN-SHARING METHOD, TRANSMISSION-SIDE TERMINAL, RECEPTION-SIDE TERMINAL, AND RECORDING MEDIUM

(75) Inventor: Takafumi Azuma, Tokyo (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 10/788,224

(22) Filed: Feb. 26, 2004

(65) Prior Publication Data

US 2004/0253991 A1    Dec. 16, 2004

(30) Foreign Application Priority Data

Feb. 27, 2003    (JP)    ............... 2003-051402

(51) Int. Cl.
    *G06F 15/173*    (2006.01)
(52) U.S. Cl. ............... 709/224; 455/566; 709/225; 709/205
(58) Field of Classification Search ......... 709/224–225; 455/566
    See application file for complete search history.

(56) References Cited

U.S. PATENT DOCUMENTS

| 6,041,326 | A  | * | 3/2000  | Amro et al. ............... 707/10 |
| 6,442,433 | B1 | * | 8/2002  | Linberg ............... 607/60 |
| 6,486,892 | B1 | * | 11/2002 | Stern ............... 715/760 |
| 7,107,574 | B1 | * | 9/2006  | Nedbal ............... 717/120 |
| 7,237,222 | B1 | * | 6/2007  | Nedbal et al. ............... 717/100 |
| 7,328,234 | B1 | * | 2/2008  | Nedbal et al. ............... 709/202 |
| 2002/0033844 | A1 | * | 3/2002  | Levy et al. ............... 345/744 |
| 2002/0154157 | A1 | * | 10/2002 | Sherr et al. ............... 345/716 |
| 2002/0194312 | A1 | * | 12/2002 | Hino ............... 709/219 |
| 2003/0001856 | A1 | * | 1/2003  | Sawada et al. ............... 345/581 |
| 2003/0115112 | A1 | * | 6/2003  | Takeda et al. ............... 705/26 |
| 2003/0167209 | A1 | * | 9/2003  | Hsieh ............... 705/26 |
| 2003/0179245 | A1 | * | 9/2003  | Akagi ............... 345/804 |
| 2004/0064447 | A1 | * | 4/2004  | Simske et al. ............... 707/5 |
| 2004/0073926 | A1 | * | 4/2004  | Nakamura et al. ............... 725/53 |
| 2005/0050031 | A1 | * | 3/2005  | Matsumoto ............... 707/3 |
| 2006/0240396 | A1 | * | 10/2006 | Foo et al. ............... 434/350 |

FOREIGN PATENT DOCUMENTS

| JP | 9-101767  | 4/1997 |
| JP | 10-51753  | 2/1998 |

* cited by examiner

*Primary Examiner*—Thu Nguyen
*Assistant Examiner*—Tauqir Hussain
(74) *Attorney, Agent, or Firm*—Frommer Lawrence & Haug LLP; William S. Frommer; Thomas F. Presson

(57) ABSTRACT

A display-screen-sharing system capable of transmitting data of a display screen appearing on a transmission-side terminal to a reception-side terminal with a high degree of efficiency in accordance with a processing state of the reception-side terminal. The transmission-side terminal includes a search unit and a transmission-side transmission/reception unit. The search unit sets an area to serve as a search object on the display screen. The reception-side terminal includes a reception-side transmission/reception unit for receiving the display-screen data from the transmission-side terminal and transmitting the ready-for-reception signal to the transmission-side terminal.

14 Claims, 16 Drawing Sheets

F I G. 8
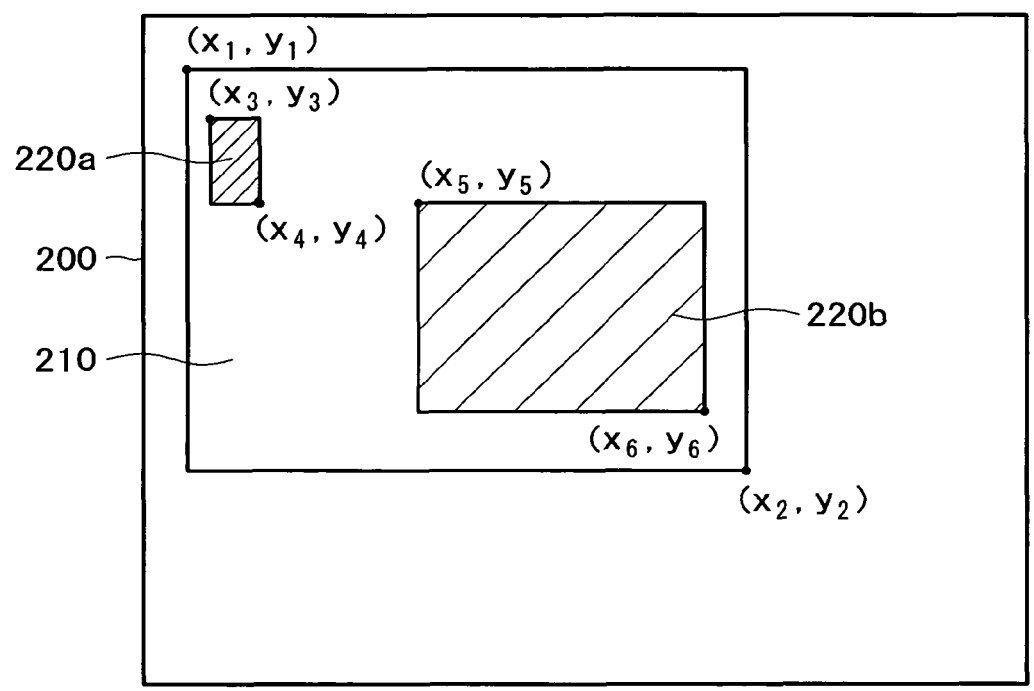

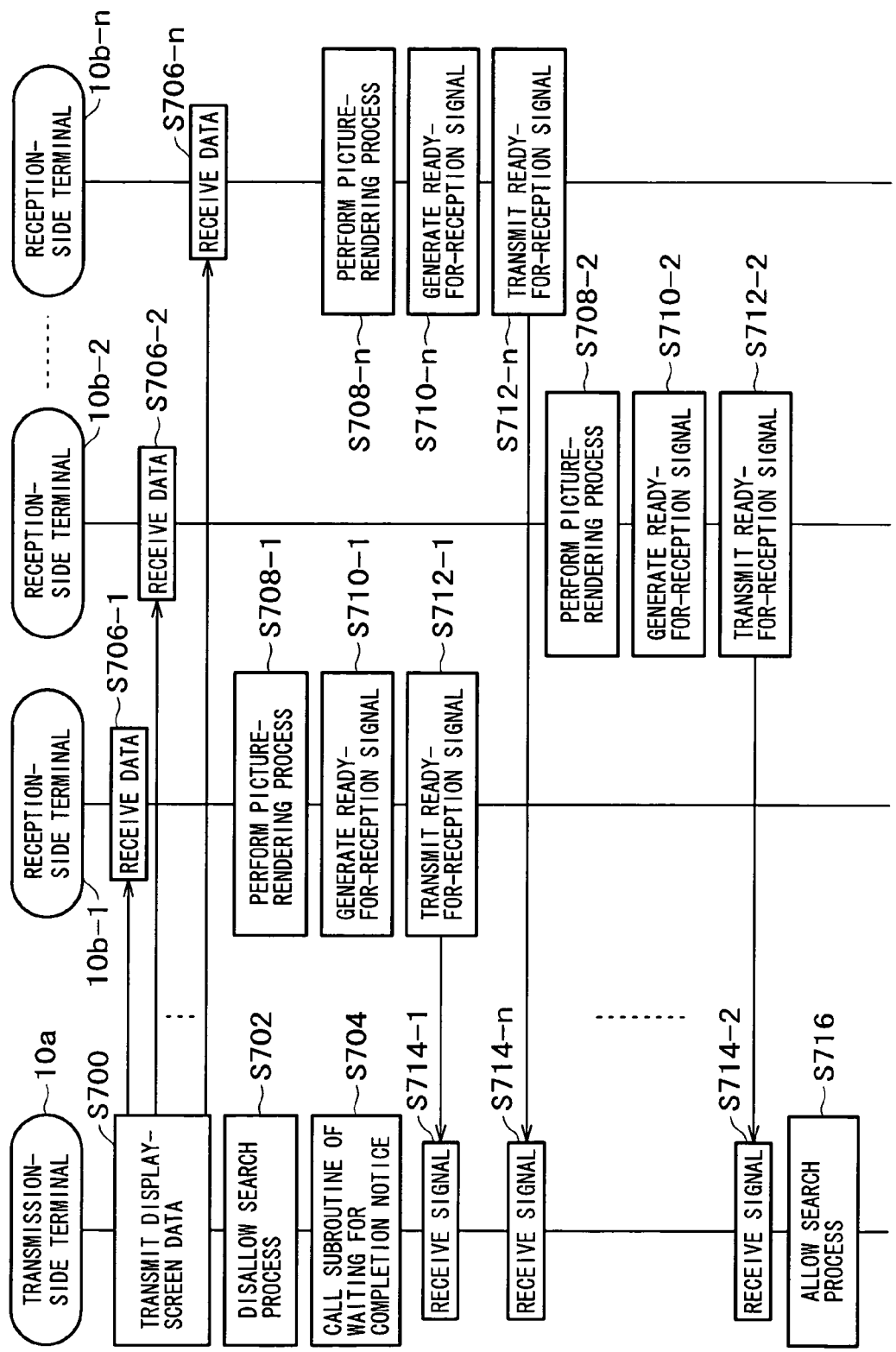

DISPLAY-SCREEN-SHARING SYSTEM, DISPLAY-SCREEN-SHARING METHOD, TRANSMISSION-SIDE TERMINAL, RECEPTION-SIDE TERMINAL, AND RECORDING MEDIUM

BACKGROUND OF THE INVENTION

The present invention relates to a display-screen-sharing system for allowing a display screen to be shared among a plurality of terminals, a display-screen-sharing method adopted by the system, transmission side and reception-side terminals used in both the system and the method, and a recording medium.

A display-screen-sharing system has been proposed as a conventional system in which a network is used for connecting a plurality of terminals remote from each other as terminals to be used in a data conference. The proposed display-screen-sharing system is capable of allowing a display screen shown on a terminal used by a presenter to be shared by terminals used by other participants of the data conference. In this display-screen-sharing system, the terminal used by a presenter (transmission-side terminal) transmits data of the display screen to terminals used by other participants (reception-side terminal) and the terminals used by other participants each reproduce the data on a display screen so that each of the other participants is capable of browsing information such as the contents of a presentation given by the presenter and the contents of a displayed material.

In the conventional display-screen-sharing system, data of a display screen on the transmission side is generally encoded at a proper frame rate according to network parameters such as a transmission rate assumed in advance in the same way as, for example, transmission of a moving picture by adoption of a streaming technique, and results of encoding are transmitted to reception sides at predetermined time intervals. In addition, every time the display screen is updated on the transmission side, the data of the updated display screen is transmitted sequentially one piece after another to the reception side without regard to the processing state on the reception side.

In the method adopted by the conventional display-screen-sharing system as a method of transmitting data of a display screen, however, not only does the load borne by the transmission-side terminal inevitably increase, but unnecessary data generated in a picture-rendering process carried out in a reception-side terminal is also transmitted, raising a problem of an unavoidably increased amount of the network traffic. Particularly, in a data conference or the like, there are many cases in which it is sufficient to transmit the contents of a presentation or the like as data of still pictures. In such cases where still pictures required after a picture-rendering process are demanded more than moving pictures are necessary in the course of the picture-rendering process so that complete real-time conditions are not needed between the transmission and reception sides, the conventional transmission technique described above results in much waste in data transmission, making the transmission inefficient.

In addition, since data of a display screen is transmitted continuously on a one-sided basis without regard to the processing state on the reception side, there is raised a problem that it is quite within the bounds of possibility that a reception-side terminal bears an excessively heavy load and/or an overflow occurs in a buffer employed in the reception-side terminal.

SUMMARY OF THE INVENTION

It is thus an object of the present invention addressing the problems described above to provide a new and improved display-screen-sharing system capable of reducing a processing load borne by each transmission-side terminal, capable of reducing the amount of traffic of a network and capable of transmitting data of a display screen appearing on the transmission-side terminal to each reception-side terminal with a high degree of efficiency in accordance with the processing state on the reception-side terminal, provide a display-screen-sharing method to be adopted by the system, provide terminals for implementing the system and the method as well as provide a recording medium for storing a program prescribing the method.

According to the first aspect of the present invention, there is provided a display-screen-sharing system, which includes 1, 2 or more transmission-side terminals, 1, 2 or more reception-side terminals as well as a network for connecting the transmission-side terminals to the reception-side terminals and allows display-screen data of the transmission-side terminals to be shared by the reception-side terminals, wherein:

each of the transmission-side terminals includes:

a search execution unit for carrying out a search process on a search-object area on a display screen to detect an updated area of the display screen;

a transmission-side transmission/reception unit for transmitting at least display-screen data of the updated area to the reception-side terminals; and a search-process control unit for putting the search process in a state of being unexecutable by the search execution unit in accordance with completion of transmission of the display-screen data;

every individual one of the reception-side terminals has a reception-side transmission/reception unit for receiving the display-screen data from any of the transmission-side terminals and transmitting a ready-for-reception signal to any of the transmission-side terminals transmitting the display-screen data as a signal indicating that the individual reception-side terminal has already entered a state of being ready to receive further display-screen data;

the transmission-side transmission/reception unit receives the ready-for-reception signal; and the search-process control unit puts the search process in a state of being executable by the search execution unit in accordance with completion of reception of the ready-for-reception signal.

In the configuration described above, every individual one of the transmission-side terminals is capable of presenting at least a portion of display-screen data appearing on the display screen of the individual transmission-side terminal to any of the reception-side terminals. In addition, every individual one of the reception-side terminals is capable of receiving display-screen data presented by any of the transmission-side terminals, carrying out a picture-rendering process on the received display-screen data and displaying a result of the picture-rendering process on the display screen of the individual reception-side terminal. Thus, each of the reception-side terminals is capable of sharing at least a portion of display-screen data appearing on the display screen of each of the transmission-side terminals.

According to the second aspect of the present invention, there is provided a display-screen-sharing system including a plurality of terminals connected to each other by a network so as to allow display-screen data of 1, 2 or more of the terminals each having a transmission right to be shared by 1, 2 or more of the reception-side terminals, wherein:

each of the terminals each having the transmission right includes:

a search execution unit for carrying out a search process on a search-object area on a display screen to detect an updated area of the display screen;

a transmission-side transmission/reception unit for transmitting at least display-screen data of the updated area to the other terminals; and a search-process control unit for putting the search process in a state of being unexecutable by the search execution unit in accordance with completion of transmission of the display-screen data;

every individual one of the other terminals has a reception-side transmission/reception unit for receiving the display-screen data from any of the terminals each having the transmission right and transmitting a ready-for-reception signal to any of the terminals each having the transmission right and transmitting the display-screen data as a signal indicating that the other individual terminal has already entered a state of being ready to receive further display-screen data;

the transmission-side transmission/reception unit receives the ready-for-reception signal; and the search-process control unit puts the search process in a state of being executable by the search execution unit in accordance with completion of reception of the ready-for-reception signal.

According to the third aspect of the present invention, there is provided a transmission-side terminal capable of allowing display-screen data to be shared by 1, 2 or more reception-side terminals connected to the transmission-side terminal by a network, the transmission-side terminal including:

a search execution unit for carrying out a search process on a search-object area on a display screen to detect an updated area of the display screen;

a transmission-side transmission/reception unit for transmitting at least display-screen data of the updated area to the reception-side terminals; and a search-process control unit for putting the search process in a state of being unexecutable by the search execution unit in accordance with completion of transmission of the display-screen data, wherein:

the transmission-side transmission/reception unit receives a ready-for-reception signal from every individual one of the reception-side terminals as a signal indicating that the individual reception-side terminal has already entered a state of being ready to receive further display-screen data; and the search-process control unit puts the search process in a state of being executable by the search execution unit in accordance with completion of reception of the ready-for-reception signal.

In the configuration described above, the search execution unit carries out the search process on a search-object area by performing a comparison process on past display-screen data and present display-screen data. The search-object area can be a portion included in a display screen as an area to serve as a search object or the whole of the display screen. The search execution then detects an updated area included in the search-object area as an area, the display screen of which has been updated as indicated by the comparison process. Subsequently, the search execution unit extracts the display-screen data of the updated area. Then, the transmission-side transmission/reception unit presents the display-screen data of the updated area to the reception-side terminals by transmitting the display-screen data to the reception-side terminals. Subsequently, the transmission-side transmission/reception unit receives a ready-for-reception signal transmitted by every individual one of the reception-side terminals as a signal indicating that the individual reception-side terminal has already entered a state of being ready to receive further display-screen data. The search-process control unit then puts the search process in a state of being executable by the search execution unit in accordance with completion of transmission of the display-screen data or in accordance with completion of reception of the ready-for-reception signal. To be more specific, the search-process control unit typically executes control to put the search process in a state of being unexecutable by the search execution unit upon completion of transmission of the display-screen data and restore the search process to a state of being executable by the search execution unit upon completion of reception of the ready-for-reception signal. In other words, the search process to be carried out by the search execution unit can be put in a standby state during a period starting at a transmission time of display-screen data and ending at a reception time of a ready-for-reception signal generated in response to the display-screen data.

As described above, the transmission-side terminal is capable of grasping the processing state of a reception-side terminal on the basis of a ready-for-reception signal received from the reception-side terminal. Thus, the transmission-side terminal is capable of properly controlling a timing to carry out a next search process and a timing to transmit next display-screen data identified in the next search process to a reception-side terminal on the basis of a ready-for-reception signal received from the reception-side terminal.

According to the fourth aspect of the present invention, there is provided a transmission-side terminal further including:

an event-monitoring unit for detecting an updating event, which possibly updates the display screen, and generating information on a range of a window included in the display screen as a window associated with the detected updating event; and a search-object-area management unit for setting the search-object area on the basis of the information on a range of a window.

In the configuration described above, while the transmission-side terminal and the reception-side terminals are sharing display-screen data of the transmission-side terminal, the event-monitoring unit is capable of detecting an updating event, which possibly updates a display screen. If an updating event is detected, the event-monitoring unit is capable of setting a window associated with the detected updating event and generating information on a range of a window included in the display screen as a window associated with the detected updating event. It is to be noted that this window typically has a rectangular shape displayed on the display screen in accordance with, among others, presentation-use software activated in the transmission-side terminal. In addition, the search-object-area management unit is capable of setting a portion or whole of the display screen as the search-object area on the basis of the information on a range of the window. Thus, it is possible to reduce the load borne by the transmission-side terminal to carry out processing including the search process.

Furthermore, it is also possible to provide the transmission-side terminal described above with a configuration in which, when the search-process control unit has put the search process in a state of being unexecutable by the search execution unit, the search-object-area management unit stocks the set search-object area on a search list, and after the search-process control unit puts the search process in a state of being executable by the search execution unit, the search execution unit carries out the search process on 1, 2 or more search-object areas stocked on the search list.

In the configuration described above, during a period of time in which the search-process control unit keeps the search process in a state of being unexecutable by the search execution unit, the search-object-area management unit merely stocks a search-object area on the search list even if the search-object area is set as a result of detection of an updating event for the search-object area. The period of time is a period starting at a transmission time of display-screen data and ending at a reception time of a ready-for-reception signal generated in response to the display-screen data. Thus, during a period of time in which preparations to receive display-screen data have not been completed in the reception-time terminals, the transmission-side terminal can be put in a state of being disabled to carry out a search process. As a result, for the entire processing to share a display screen, the number of times the search process is carried out can be reduced to result in a smaller load to be borne by the transmission-side terminal. Then, after the transmission-side transmission/reception unit receives ready-for-reception signals from the reception-side terminals, the search execution unit allowed to carry out a search process is capable of performing the search process on search-object areas stocked on the search list. Thus, an updated area associated with an updating event detected during the period is not missed because a search area including the updated area has been recorded on the search list as an object of the search process.

In addition, it is also possible to provide the transmission-side terminal described above with a configuration in which the search-object-area management unit adjusts search-object areas already stocked on the search list in order to prevent portions of the search-object areas from overlapping each other.

In the configuration described above, a plurality of search-object areas each associated with an updating event detected during a period in which the search process is in a state of being unexecutable is stocked on the search list. In this case, the search-object-area management unit is capable of adjusting the search-object areas already stocked on the search list in order to prevent portions of the search-object areas from overlapping each other. Thus, when the search execution unit allowed to carry out a search process performs the search process on the search-object areas stocked on the search list, the search execution unit will not search any portions of the search-object areas more than once. As a result, the search process can be carried out with a higher degree of efficiency and, hence, the load borne by the transmission-side terminal can be reduced.

In addition, it is also possible to provide the transmission-side terminal described above with a configuration in which the search-process control unit puts the search process in a state of being executable by the search execution unit in accordance with completion of reception of the ready-for-reception signals from all the reception-side terminals.

In the above configuration, the search-process control unit is capable of putting the search process in a state of being executable by the search execution unit typically at a point of time the reception of the ready-for-reception signals from all the reception-side terminals is completed. Thus, the control of putting the search process in a state of being executable by the search execution unit can be executed in accordance with the pace of a reception-side terminal having poorest performances such as a smallest reception-processing power and/or a lowest speed of communication with the network. As a result, the transmission-side terminal is capable of presenting display-screen data to the reception-side terminals with a proper timing that does not cause any particular one of the reception-side terminals to bear an excessively heavy load due to an excessively large amount of display-screen data transmitted to the particular reception-side terminal.

According to the fifth aspect of the present invention, there is provided a recording medium for storing a program readable by a computer for execution to implement a display-screen-sharing method adopted by a transmission-side terminal to at least allow display-screen data of the transmission-side terminal to be shared by 1, 2 or more reception-side terminals connected to the transmission-side terminal by a network, wherein the display-screen-sharing method prescribed by the program includes:

a search execution step of carrying out a search process on a search-object area on a display screen to detect an updated area of the display screen;

a transmission-side transmission/reception step of transmitting at least display-screen data of the updated area to the reception-side terminals;

a search-process control step of putting the search process in a state of being unexecutable at the search execution step in accordance with completion of transmission of the display-screen data, a transmission-side transmission/reception step of receiving a ready-for-reception signal from every individual one of the reception-side terminals as a signal indicating that the individual reception-side terminal has already entered a state of being ready to receive further display-screen data; and a search-process control step of putting the search process in a state of being executable at the search execution step in accordance with completion of reception of the ready-for-reception signal.

According to the sixth aspect of the present invention, there is provided a reception-side terminal capable of sharing display-screen data of 1, 2 or more transmission-side terminals connected to the reception-side terminal by a network, the reception-side terminal having a reception-side transmission/reception unit for receiving the display-screen data from any of the transmission-side terminals and transmitting a ready-for-reception signal to any of the transmission-side terminals transmitting the display-screen data as a signal indicating that the reception-side terminal has already entered a state of being ready to receive further display-screen data.

In the reception-side terminal described above, by receiving display-screen data of an updated area from any of the transmission-side terminal through the network, the reception-side transmission/reception unit is capable of acquiring the display-screen data for use in updating the area to be updated. In addition, the reception-side transmission/reception unit is capable of transmitting a ready-for-reception signal to any of the transmission-side terminals transmitting the display-screen data as a signal indicating that the reception-side terminal has already entered a state of being ready to receive further display-screen data by way of the network typically at a point of time the processing of the display-screen data is completed, putting the reception-side terminal in the state of being ready to receive further display-screen data.

Preferably, the reception-side terminal further includes:

a picture-rendering unit for carrying out a picture-rendering process on the display-screen data received from any of the transmission-side terminals; and a ready-for-reception-signal generation unit for generating the ready-for-reception signal upon completion of the picture-rendering process.

In the configuration described above, the picture-rendering unit is capable of carrying out a picture-rendering process on the display-screen data received from any of the transmission-side terminals. In addition, the ready-for-reception-signal generation unit is capable of generating the ready-for-reception signal with a timing set at completion of a process to display a result of the picture-rendering process on the display screen of the reception-side terminal. The reception-side transmission/reception unit transmits the ready-for-reception signal to any of the transmission-side terminals transmitting the display-screen data. In this way, the reception-side terminal is capable of notifying any of the transmission-side terminals transmitting the display-screen data that the picture-rendering process carried out on the display-screen data is completed, putting the reception-side terminal in the state of being ready to receive further display-screen data.

According to the seventh aspect of the present invention, there is provided a recording medium for storing a program readable by a computer for execution to implement a display-screen-sharing method adopted by a reception-side terminal capable of sharing display-screen data of 1, 2 or more transmission-side terminals connected to the reception-side terminal by a network, wherein the display-screen-sharing method prescribed by the program has the step of receiving the display-screen data from any of the transmission-side terminals and transmitting a ready-for-reception signal to any of the transmission-side terminals transmitting the display-screen data as a signal indicating that the reception-side terminal has already entered a state of being ready to receive further display-screen data.

According to the eighth aspect of the present invention, there is provided a display-screen-sharing method for allowing display-screen data of 1, 2 or more transmission-side terminals to be shared by 1, 2 or more reception-side terminals connected to the transmission-side terminals by a network, the display-screen-sharing method including the steps of:

driving any of the transmission-side terminals to carry out a search process on a search-object area of a display screen to detect an updated area of the display screen;

driving any of the transmission-side terminals to transmit at least display-screen data of the updated area to the reception-side terminals and putting the search-object in an unexecutable state;

driving every individual one of the reception-side terminals to receive the display-screen data from any of the transmission-side terminals and transmit a ready-for-reception signal to any of the transmission-side terminals transmitting the display-screen data as a signal indicating that the individual reception-side terminal has already entered a state of being ready to receive further display-screen data; and driving any of the transmission-side terminals to receive the ready-for-reception signal and putting the search object in an executable state.

In the configuration described above, every individual one of the transmission-side terminals is capable of presenting at least a portion of display-screen data appearing on the display screen of the individual transmission-side terminal to the reception-side terminals. On the other hand, every individual one of the reception-side terminals is capable of receiving display-screen data presented by any of the transmission-side terminals, carrying out a picture-rendering process on the received display-screen data and displaying a result of the picture-rendering process on the display screen of the individual reception-side terminal. In this way, every individual one of the transmission-side terminals and the reception-side terminals are capable of sharing at least a portion of display-screen data appearing on the display screen of the individual one of the transmission-side terminal. At that time, each of the transmission-side terminals is capable of grasping the processing state of each of the reception-side terminals. Thus, each of the transmission-side terminals is capable of carrying out a next search process with a timing proper for, among others, the processing states of the reception-side terminals and transmitting next display-screen data to the reception-side terminals.

According to the ninth aspect of the present invention, there is provided a display-screen-sharing method further including the step of driving any of the transmission-side terminals to:

detect an updating event, which possibly updates the display screen, and generating information on a range of a window included in the display screen as a window associated with the detected updating event; and set the search-object area on the basis of the generated information on a range of a window.

According to the tenth aspect of the present invention, there is provided a display-screen-sharing method wherein the step of driving any of the transmission-side terminals to set the search-object area further includes the steps of:

stocking the set search-object area on a search list if the search process has already been put in a state of being unexecutable; and carrying out the search process on 1, 2 or more search-object areas stocked on the search list if the search process has already been put in a state of being executable.

According to the eleventh aspect of the present invention, there is provided a display-screen-sharing method wherein the step of setting the search-object area further includes the step of adjusting a plurality of search-object areas already stocked on the search list in order to prevent portions of the search-object areas from overlapping each other.

According to the twelfth aspect of the present invention, there is provided a display-screen-sharing method whereby, at the step of putting the search object in an executable state, the search object is put in an executable state in accordance with completion of reception of the ready-for-reception signals from all the reception-side terminals.

According to the thirteenth aspect of the present invention, there is provided a display-screen-sharing method further having the step of driving each of the reception-side terminals to:

carry out a picture-rendering process on the display-screen data received from any of the transmission-side terminals; and generate the ready-for-reception signal upon completion of the picture-rendering process.

As described above, in accordance with the present invention, a transmission-side terminal is capable of transmitting data of a display screen to a reception-side terminal with a high degree of efficiency in accordance with a processing state of the reception-side terminal. Thus, a processing load borne by the transmission-side terminal can be reduced substantially and the amount of traffic through a network connecting the transmission-side terminal to the reception-side terminal can also be decreased as well. In addition, it is possible to prevent the reception-side terminal from bearing an excessively heavy processing load and an overflow from occurring in a buffer employed in the reception-side terminal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is an explanatory diagram showing a typical area to serve as a search object and a typical updated area, which are included in a display screen of the transmission-side terminal implemented by the first embodiment;

FIG. 18 shows a flowchart representing a data-conference method adopted in the second embodiment.

DETAILED DESCRIPTION OF THE PREFERRED EMBODIMENTS

Figure 1:
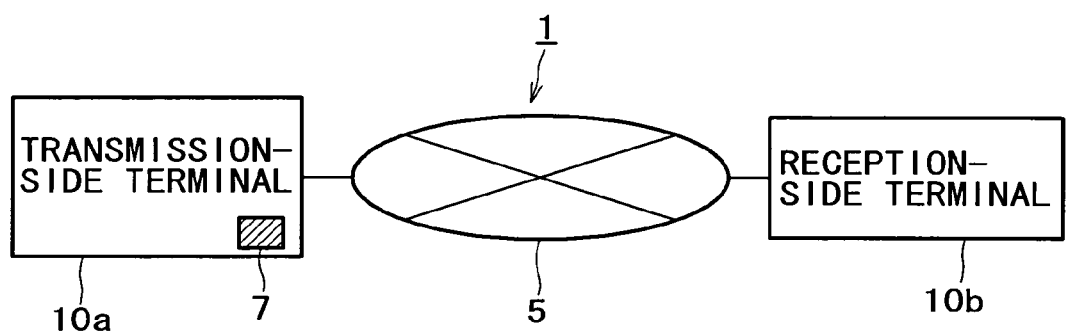
FIG. 1 is a block diagram showing a rough configuration of a data conference system implemented by a first embodiment.

Preferred embodiments of the present invention are explained in detail by referring to the diagrams as follows. It is to be noted that, throughout this specification and the diagrams, configuration elements having functional configurations essentially identical with each other are denoted by the same reference numeral so as to avoid duplication of explanation.

First Embodiment

First of all, the following description explains a display-screen-sharing system implemented by a first embodiment of the present invention and a display-screen-sharing method adopted by the system. In the following description, the display-screen-sharing system implemented by the embodiment and the display-screen-sharing method are typically applied as a data conference system (or a network conference system) and a data conference method respectively. However, applications of the present invention are not limited to the data conference system and the data conference method.

<1: System Configuration>

To begin with, the overall configuration of a data conference system implemented by the embodiment is explained by referring to FIG. 1 as follows. It is to be noted that FIG. 1 is a block diagram showing a rough configuration of the data conference system 1 implemented by the embodiment.

As shown in FIG. 1, the data conference system 1 implemented by the embodiment includes mainly a transmission-side terminal 10a, a reception-side terminal 10b and a network 5 connecting the transmission-side terminal 10a to the reception-side terminal 10b.

The transmission-side terminal 10a and the reception-side terminal 10b are each an information-processing apparatus typically including at least a central processing unit (CPU), a transmission-reception unit, a storage unit and a display unit. In general, the transmission-side terminal 10a and the reception-side terminal 10b are each designed as a computer such as a personal computer. In the following description, the transmission-side terminal 10a and the reception-side terminal 10b are also both referred to as a terminal 10, which is a generic name given to them, if there is no need to distinguish one from the other. However, implementations of the terminal 10 are not limited to a computer. That is to say, the terminal 10 can also be implemented as one of various kinds of information-processing equipment such as a portable phone, an information consumer electronic apparatus, a portable terminal, a PDA and a communication terminal having a television conference function.

The transmission-side terminal 10a is a terminal typically utilized by a presenter in a data conference. Thus, the transmission-side terminal 10a is a terminal on the transmission side, which provides or transmits data of a display screen of the presenter to the reception-side terminal 10b. In the transmission-side terminal 10a, various kinds of software are installed. Examples of the installed software are presentation-use software and a word processor. Data of the contents of a presentation or the contents of a presented material (simply referred to as presentation contents, hereunder) specified by the presenter is displayed on typically a desk-top screen serving as the display screen of the presenter, and the presenter is capable of switching the display screen from presentation contents to others from time to time by carrying out an operation.

The transmission-side terminal 10a is given a transmission right 7, which is a right to transmit data of a display screen of the transmission-side terminal 10a to another terminal. The transmission right 7 corresponds to an authority of the presenter in the data conference. To put it concretely, the transmission right 7 is granted to one, two or more terminals 10 included in the data-conference system 1 to serve as a terminal 10 used by the presenter. In the typical configuration shown in FIG. 1, the transmission right 7 is granted to only one terminal 10, i.e., the transmission-side terminal 10*a*.

By owning the transmission right 7, the transmission-side terminal 10*a* is capable of transmitting all of picture data appearing on its own display screen or a portion of the picture data, that is, all of display-screen data or a portion of the display-screen data, to the reception-side terminal 10*b* by way of the network 5. In addition, the transmission-side terminal 10*a* is capable of properly controlling a timing, with which the data of a display screen is transmitted, on the basis of a ready-for-reception signal received from the reception-side terminal 10*b*. Details of this control will be described later.

On the other hand, the reception-side terminal 10*b* is a terminal used by a participant attending the data conference as a listener. That is to say, the reception-side terminal 10*b* is a terminal on the reception side for accepting (receiving) data of a display screen from another terminal. The reception-side terminal 10*b* is capable of carrying out a process of rendering a picture on the display-screen data received from the transmission-side terminal 10*a* in order to display a picture based on the data on the display screen of the reception-side terminal 10*b*. In addition, the reception-side terminal 10*b* is also capable of generating the ready-for-reception signal and transmitting the ready-for-reception signal to the transmission-side terminal 10*a* in response to the received data of a display screen at the time the process of rendering a picture carried out on the display-screen data is completed.

The network 5 is a communication-line network for connecting the transmission-side terminal 10*a* to the reception-side terminal 10*b* in such a way that the transmission-side terminal 10*a* and the reception-side terminal 10*b* are capable of communicating with each other in both directions. The network 5 is typically implemented as a public line network such as the Internet or a dedicated line network such as a WAN, a LAN or an IP-VPN. In addition, the connection media of the network 5 can be typically implemented as an optical fiber cable conforming to the specifications of the FDDI (Fiber Distributed Data Interface) or the like, or implemented as a coaxial or twist cable conforming to the specifications of the Ethernet (a registered trademark). As an alternative, the network 5 may include a satellite communication network conforming to the IEEE802.11b specifications or the like without regard to whether the network 5 is a wire-communication network or a radio-communication network. It is to be noted that the terminal 10 employed in this embodiment is designed as a terminal capable of transmitting and receiving various kinds of data including data of a display screen in accordance with a predetermined protocol such as a TCP/IP (Transmission Control Protocol/Internet Protocol). However, the convention is not limited to the TCP/IP. That is to say, the terminal 10 may also transmit and receive data in accordance with a UDP (User Datagram Protocol).

As explained so far, in the data-conference system 1 having the configuration described above, the transmission-side terminal 10*a* is capable of presenting display-screen data representing its own display screen to the reception-side terminal 10*b* by way of the network 5. On the other hand, the reception-side terminal 10*b* is capable of carrying out a picture-rendering process on the presented display-screen data in order to display the data on its own display screen. In this way, the transmission-side terminal 10*a* and the reception-side terminal 10*b* are capable of sharing the data of a display screen of the transmission-side terminal 10*a*.

Thus, by using the reception-side terminal 10*b*, a participant of the data conference is capable of browsing presentation contents appearing on the display screen of the transmission-side terminal 10*a* in an all but real-time manner. In the data conference, the presenter and the participant are capable of sharing presentation contents for not only a case in which the presenter and the participant are close to each other, but also a case in which the presenter and the participant are present at locations remote from each other. An example of the case in which the presenter and the participant are close to each other is a data conference held in the same conference room, a data conference held on the same floor or a data conference held in the same building. On the other hand, an example of the case in which the presenter and the participant are present at locations remote from each other is a data conference between the headquarters located in Tokyo and a branch office located in the island of Hokkaido or a data conference between a conference participant staying at home and another conference participant boarding on a bullet train moving along the Shinkansen train line. Thus, the degree of freedom given to the presenter and the participant as freedom to select locations to take part in the data conference is higher, making the conference more useful.

As described above, the data-conference system 1 uses the network 5 to connect two or more spots separated from each other, allowing the reception-side terminal 10*b* to share a display screen of the transmission-side terminal 10*a*. Thus, the data-conference system 1 is capable of smoothly advancing presentations of a network conference, a seminar or the like. It is to be noted that the data-conference system 1 may also be designed into such a configuration that, in the data conference, a display screen such as the one described above can be shared and, at the same time, the terminals 10 are capable of sharing audio information such as the contents of a speech made by the presenter or a participant by using separate audio communication means including microphones and speakers, which are not shown in the figure. In addition, the data-conference system 1 can also be used in conjunction with a television conference system so as to transmit video and audio information of the presenter to all other participants.

Furthermore, in the data-conference system 1, the transmission right 7 can be transferred among the terminals 10. To put it concretely, in the typical configuration shown in FIG. 1, the transmission right 7 owned by the transmission-side terminal 10*a* can be transferred to the reception-side terminal 10*b*. By transferring the transmission right 7 from the transmission-side terminal 10*a* to the reception-side terminal 10*b*, the function of the transmission-side terminal 10*a* is reversed to that of the reception-side terminal 10*b* and vice versa. That is to say, the transmission-side terminal 10*a* can be used as a terminal functioning as the reception-side terminal 10*b* while the reception-side terminal 10*b* can be used as a terminal functioning as the transmission-side terminal 10*a*. Since the transmission right 7 can be made transferable among the terminals 10 as such, the presenter of the data conference is capable of making a presentation by allowing data of a display screen of the terminal 10 used by the presenter to be shared by another terminal 10 without regard to which terminal 10 is being used by the presenter. In addition, the data-conference system 1 is capable of keeping up with a case in which the participants of the data conference serve as a presenter by turns.

Moreover, the transmission right 7 can also be granted to both the terminals 10. In this case, any of the terminals 10 is capable of presenting some of its own display-screen data to the other terminal 10 serving as a partner of presentation. In such a configuration, both the terminals 10 are capable of mutually sharing data of their display screens with each other, and any of the terminals 10 is capable of displaying some of its own display-screen data on a display screen of the other terminal 10 serving as a partner of presentation. Thus, the data-conference system 1 is capable of keeping up with a case in which both the participants of the data conference serve as a presenter at the same time and a case in which both the participants mutually show presentation contents to each other.

<2: Configuration of the Terminal>

Figure 2:
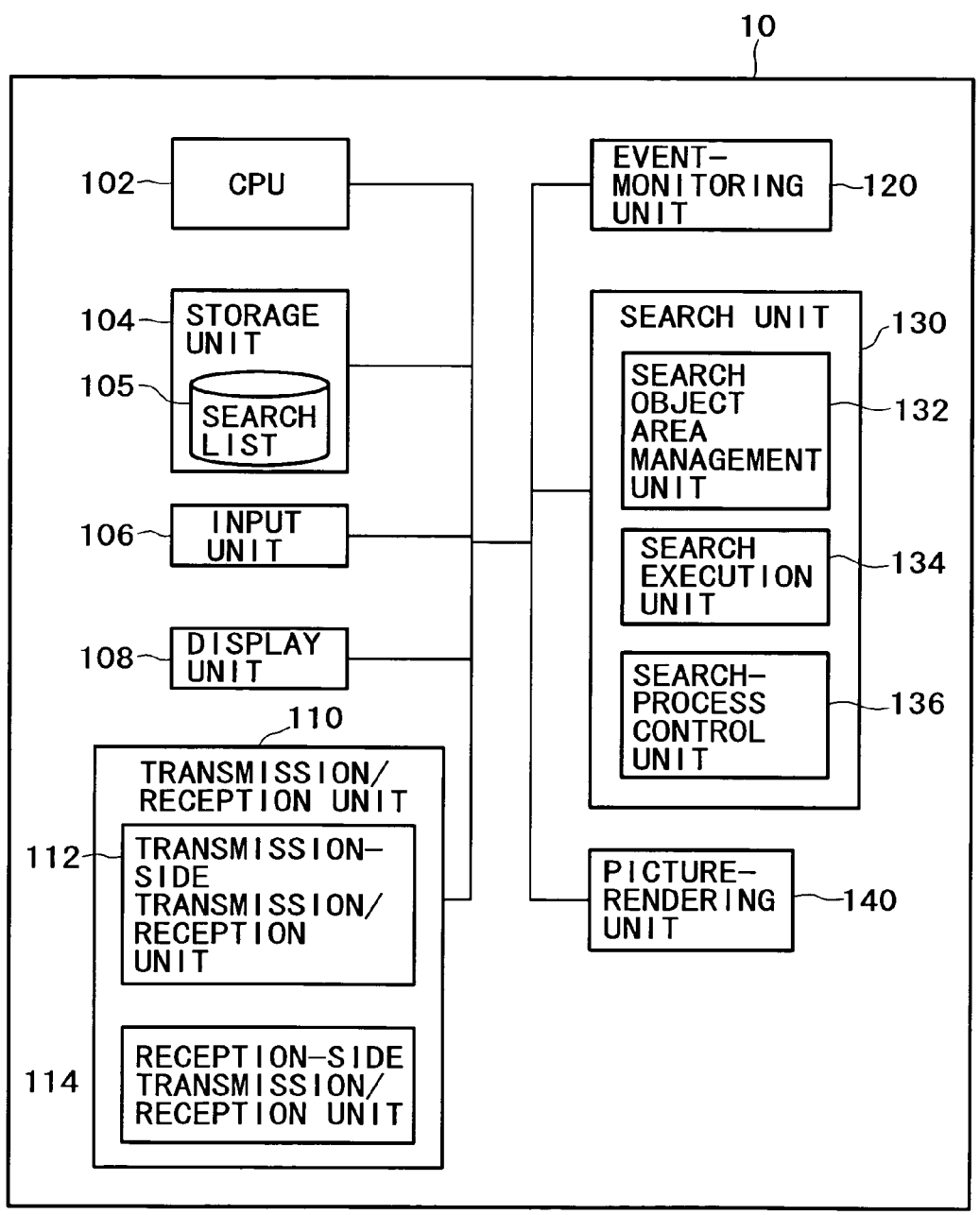
FIG. 2 is a block diagram showing a rough configuration of a terminal employed in the first embodiment.

Next, the configuration of the terminal 10 employed in the embodiment is explained by referring to FIG. 2. It is to be noted that FIG. 2 is a block diagram showing a rough configuration of the terminal 10 employed in the embodiment.

As shown in FIG. 2, the terminal 10 includes a CPU 102, a storage unit 104, an input unit 106, a display unit 108, a transmission/reception unit 110, an event-monitoring unit 120, a search unit 130 and a picture-rendering unit 140.

The CPU 102 is typically a central processing unit serving as a control unit. The CPU 102 is capable of controlling, among others, instructions and processes carried out by the other components employed in the terminal 10. For example, the CPU 102 is capable of activating various kinds of software such as presentation-use software stored in the storage unit 104 or the like, and controlling operations of the software.

The storage unit 104 is a storage device for temporarily recording or storing various kinds of data, a variety of programs and other information. The storage unit 104 is typically implemented as a RAM (Random Access Memory), a ROM (Read Only Memory), an EEPROM (Electrically Erasable and Programmable ROM), a DRAM (Dynamic RAM), an SRAM (Static RAM), an SDRAM (Synchronous DRAM), an MRAM (Magneto-resistive RAM), a hard disk, a flexible disk, a magnetic tape, an optical disk or another storage device.

For example, the storage unit 104 is used for recording various kinds of presentation preparation software utilized by the presenter to explain the contents of a presentation. Examples of the presentation preparation software (hereunder, referred to as presentation-use software) include a word processor such as Word XP (a registered trademark) of Microsoft (a registered trademark), spreadsheet-work software such as Excel XP (a registered trademark), presentation preparation software such as PowerPoint XP and browser software such as Internet Explorer (a registered trademark). It is to be noted that these pieces of presentation-use software can be read out for activation from a recording medium such as a flexible disk, a CD-ROM or a DVD-ROM typically by using a variety of disk drives, or received for activation from an external source by way of the network 5 or other communication means. In addition, a portion of the storage area of the storage unit 104 is typically used for storing a search list 105 to be described later.

The input unit 106 is operation means including a keyboard and a pointing device such as a mouse, a track ball, a track pad, a stylus pen or a joy stick. By operating the input unit 106, the user of the terminal 10, that is, the presenter or a participant in the conference, is capable of requesting the terminal 10 to carry out a variety of processing operations and entering various kinds of data to the terminal 10.

The display unit 108 is a display device implemented typically by a CRT display unit or a liquid-crystal display (LCD) unit. The display unit 108 is capable of outputting various kinds of display-screen data to a display screen for displaying the data.

Assume for example that the terminal 10 functions as the transmission-side terminal 10a. In this case, when the presentation-use software of the terminal 10 is activated, for example, the display unit 108 employed in the terminal 10 displays a window for the presentation-use software on a portion of its display area or in the entire display area. If the terminal 10 functions as the reception-side terminal 10b, on the other hand, the display unit 108 employed in the terminal 10 displays display-screen data obtained as a result of a picture-rendering process carried out by the picture-rendering unit 140 to be described later on a portion of its display area or in the entire display area. It is to be noted that, in general, the display-screen data displayed by the display unit 108 is typically data of a still picture statically showing the contents of a presentation. However, data of a display screen is not limited to such a still picture. For example, data of a display screen can also be data of a moving picture moving dynamically to show the contents of a presentation. In addition, the display unit 108 may have a configuration including an audio output unit, which is not shown in the figure, as a unit for carrying out an audio output operation to output information such as audio data representing contents of a speech made by the presenter.

Connected to the network 5, the transmission/reception unit 110 is a component capable of exchanging various kinds of data with the other terminal 10. The transmission/reception unit 110 typically includes a transmission-side transmission/reception unit 112 and a reception-side transmission/reception unit 114.

The transmission-side transmission/reception unit 112 employed in a terminal 10 is a transmitting/receiving unit, which operates when the terminal 10 functions as the transmission-side terminal 10a. The transmission-side transmission/reception unit 112 encodes for example display-screen data received from the search unit 130 to be described later and transmits the encoded data to the reception-side terminal 10b. In addition, the transmission-side transmission/reception unit 112 receives a ready-for-reception signal transmitted by the reception-side terminal 10b, and passes on the signal to the search unit 130.

On the other hand, the reception-side transmission/reception unit 114 employed in a terminal 10 is a transmitting/receiving unit, which operates when the terminal 10 functions as the reception-side terminal 10b. The reception-side transmission/reception unit 114 receives display-screen data transmitted by the transmission-side terminal 10a by way of the network 5, encodes the received data and outputs the encoded data to the picture-rendering unit 140.

In addition, informed by the picture-rendering unit 140 of typically completion of a picture-rendering process carried out on data of a display screen in the reception-side terminal 10b, for example, the reception-side transmission/reception unit 114 generates a ready-for-reception signal indicating that the reception-side terminal 10b has entered a state of being ready for receiving next display-screen data. That is to say, the reception-side transmission/reception unit 114 has a configuration also to function as a unit for generating a ready-for-reception signal in this embodiment. It is to be noted, however, that the unit for generating a ready-for-reception signal can also be provided independently of the reception-side transmission/reception unit 114.

Moreover, by transmitting the ready-for-reception signal to the transmission-side terminal 10a by way of the network 5, for example, the reception-side transmission/reception unit 114 is capable of informing the transmission-side terminal 10a that the reception-side terminal 10b has entered a state of being ready for receiving next display-screen data because a picture-rendering process carried out on the present display-screen data in the reception-side terminal 10*b* has been completed.

It is to be noted that the reception-side transmission/reception unit 114 employed in the reception-side terminal 10*b* may also generate a ready-for-reception signal and transmit the signal to the transmission-side terminal 10*a* typically at a point of time a process carried out on the present display-screen data in the reception-side terminal 10*b* is completed. For example, the reception-side transmission/reception unit 114 may also generate a ready-for-reception signal and transmit the signal to the transmission-side terminal 10*a* prior to execution of a process to decode the present display-screen data or the picture-rendering process carried out on the present display-screen data. In this case, the ready-for-reception signal functions as a signal indicating completion of a process to receive the present display-screen data. It is to be noted that, as the ready-for-reception signal, it is possible to transmit typically an ACK (acknowledgement) signal, which is generally used as a signal indicating completion of a transmission or reception process carried out in a TCP/IP network.

The event-monitoring unit 120 is a component capable of detecting occurrence of, for example, an updating event that may possibly cause some pictures to be rendered on the display screen of the transmission-side terminal 10*a*. Examples of the updating event include an operation carried out by the presenter on the input unit 106 and activation of various kinds of software. Examples of the operation carried out by the presenter on the input unit 106 are an operation to click the mouse and an operation carried out on the keyboard. In addition, when the event-monitoring unit 120 detects occurrence of an updating event, for example, the event-monitoring unit 120 specifies a window provided for the updating event and generates information on a window range for the window. The information on a window range typically includes coordinates of a location of the window on the display screen and the size of the window at the location. In general, a window associated with presentation-use software as a typical window appearing on the display screen has a rectangular shape. Thus, the coordinates of a location of the window on the display screen and the size of window at the location can be expressed typically by two pieces of positional information. The event-monitoring unit 120 then outputs the window-range information generated as such to the search unit 130.

The search unit 130 is a component having a function to set an area to serve as a search object in a display screen typically on the basis of this information on a window range and a function to search this search-object area. The search unit 130 typically includes a search-object-area management unit 132, a search execution unit 134 and a search-process control unit 136.

When receiving a notice from the event-monitoring unit 120, for example, the search-object-area management unit 132 sets an area to serve as a search object in a display screen on the basis of the information on a window range. To put it in detail, the search-object-area management unit 132 sets at least a partial area on the display screen identified by the window-range information of a window, for which an updating event described above has occurred, as the area to serve as a search object. In addition, the search-object-area management unit 132 records information on the set area to serve as a search object typically on the search list 105 stored in the storage unit 104. Furthermore, if a plurality of areas each to serve as a search object has been recorded on the search list 105, the search-object-area management unit 132 typically examines the areas to determine whether or not portions of the areas overlap each other. If portions of the areas each to serve as a search object overlap each other, the areas can be set once more and readjusted so as to prevent the area portions from overlapping each other. A process to prevent the area portions from overlapping each other will be described in detail later. Moreover, at a point of time the search process carried out by the search execution unit 134 on a search-object area is completed, the search-object-area management unit 132 deletes the area from the search list 105.

The search execution unit 134 is a component for searching one, two or more search-object areas recorded on the search list 105 to detect an updated area of an updated display screen. To put it in more detail, for a set area to serve as a search object, the search execution unit 134 compares display-screen data used in a previous search process, that is, display-screen data for comparison use, with display-screen data currently displayed on the display unit 108, that is, the actual display-screen data, in an attempt to detect an updated area. Typically, the search execution unit 134 compares these two pieces of display-screen data in predetermined block units. If an updated area actually exists, the search execution unit 134 extracts the display-screen data of the updated area and outputs the data to the transmission-side transmission/reception unit 112. The extracted display-screen data typically includes coordinates representing the position of the updated area on the display screen.

The search-process control unit 136 is a component for permitting or inhibiting the search process to be carried out by the search execution unit 134 as described above. To put it in detail, at a point of time the search execution unit 134 outputs data of a display screen to the transmission-side transmission/reception unit 112 or at a point of time the transmission-side transmission/reception unit 112 transmits the data of a display screen to the reception-side terminal 10*b*, for example, the search execution unit 134 turns off a search flag so as to prevent the search execution unit 134 from carrying out a search process thereafter. Meanwhile, at a point of time a ready-for-reception signal generated by the reception-side terminal 10*b* in response to the data of a display screen is received from the transmission-side transmission/reception unit 112 or at a point of time the transmission-side transmission/reception unit 112 receives the ready-for-reception signal from the reception-side terminal 10*b*, the search execution unit 134 turns on the search flag so as to allow the search execution unit 134 to carry out a search process thereafter. In other words, the search-process control unit 136 is capable of executing control so that, after data of a display screen is transmitted to the reception-side terminal 10*b*, for example, a search process is put in a standby or unexecutable state by prevention of the search execution unit 134 from carrying out the search process till a ready-for-reception signal generated by the reception-side terminal 10*b* in response to the data of a display screen is received and, during other periods of time, the search execution unit 134 is allowed to carry out a search process.

By virtue of the configuration described above, for example, the search unit 130 is capable of putting the search process in a standby (inhibited) state till a ready-for-reception signal generated by the reception-side terminal 10*b* is received even if an updating event occurs. The reason why the search process is put in a standby state in spite of the fact that an updating event occurs is consideration of the possibility that another updating event may further occur before a ready-for-reception signal is received. In this way, the search process is not carried out wastefully so that the efficiency of the search process can be increased and the load borne by the transmission-side terminal 10*a* can be reduced.

The picture-rendering unit 140 operates, for example, when the terminal 10 functions as the reception-side terminal 10b. The picture-rendering unit 140 is a component for carrying out a picture-rendering process on display-screen data received from the reception-side transmission/reception unit 114 and displaying the result of the process on the display screen of the display unit 108. Thus, the reception-side terminal 10b is capable of reproducing at least a portion of a display screen appearing on the transmission-side terminal 10a to be displayed on the display screen of the display unit 108 employed in the reception-side terminal 10b. In addition, at a point of time the picture-rendering process carried out on data of a display screen is finished, the picture-rendering unit 140 informs the reception-side transmission/reception unit 114 that the picture-rendering process has been completed.

It is to be noted that the components such as the transmission-side transmission/reception unit 112, the reception-side transmission/reception unit 114, the event-monitoring unit 120, the search unit 130 and the picture-rendering unit 140, which are described above, can each be typically implemented by hardware of dedicated apparatus or an application program installed in the terminal 10 as long as their processing functions like those explained earlier can be carried out. If an application program is used for implementing any of the components, the program can be supplied to the terminal 10 by storing the program on a recording medium such as a CD-ROM. As an alternative, the application program can also be downloaded from an external source to the terminal 10 by way of the network 5. As another alternative, the application program can also be stored in advance in the storage unit 104 employed in the terminal 10 or an external apparatus connected to the terminal 10 by typically an external interface, which is not shown in the figure.

A rough configuration of the terminal 10 implemented by the embodiment has been explained so far. In this embodiment, the configuration of the terminal 10 described above can be typically regarded as the configurations of both the transmission-side terminal 10a and the reception-side terminal 10b. That is to say, with the configuration described above, both the transmission-side terminal 10a and the reception-side terminal 10b are capable of functioning as either a presenter-side terminal for transmitting data of a display screen or a listener-side terminal for receiving the data of a display screen. Thus, the transmission right 7 can be transferred from a terminal 10 to another in the data-conference system 1.

For example, if the transmission right 7 is not exchanged between the terminals 10, that is, if the terminal 10 used by the presenter is fixed, however, it is not necessary to provide both the transmission-side terminal 10a and the reception-side terminal 10b with all the components described earlier. To put it in detail, if the terminal 10 functions only as the transmission-side terminal 10a, for example, it is sufficient to provide the terminal 10 with at last the CPU 102, the storage unit 104, the input unit 106, the display unit 108, the transmission-side transmission/reception unit 112, the event-monitoring unit 120 and the search unit 130. If the terminal 10 functions only as the reception-side terminal 10b, on the other hand, it is sufficient to provide the terminal 10 with at last the CPU 102, the storage unit 104, the input unit 106, the display unit 108, the reception-side transmission/reception unit 114 and the picture-rendering unit 140.

<3: Outline of Operations of the Data Conference System>

Figure 3:
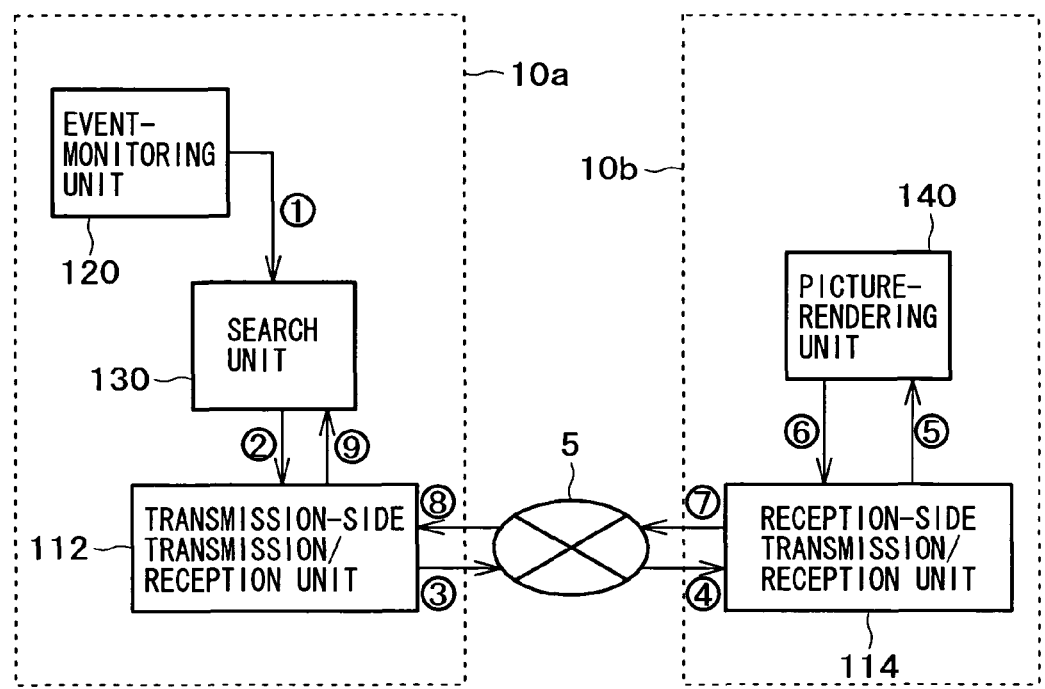
FIG. 3 is an explanatory block diagram referred to in describing a rough sequence of operations carried out by the data conference system implemented by the first embodiment.

Next, an outline of operations carried out by the data-conference system 1 implemented by the embodiment is explained by referring to FIG. 3. FIG. 3 is an explanatory block diagram referred to in describing a rough sequence of operations carried out by the data-conference system 1 implemented by the embodiment. It is to be noted that, in order to make the explanation easy to understand, FIG. 3 shows only main components employed in both the transmission-side terminal 10a and reception-side terminal 10b.

As shown in FIG. 3, first of all, when the data-conference system 1 operates and an operation carried out by the transmission-side terminal 10a to present data of a display screen is started, the event-monitoring unit 120 works, starting an operation to monitor an updating event described above. An example of the updating event is an operation carried out by the presenter to click the mouse to change a display screen. If such an updating event occurs in the course of the operation to monitor an updating event, the event-monitoring unit 120 notifies the search unit 130 that the updating event has occurred in operation (1). In actuality, the event-monitoring unit 120 informs the search unit 130 that the updating event has occurred typically by supplying window-range information for the updating event to the search unit 130. It is to be noted that, even after the event-monitoring unit 120 notifies the search unit 130 of the occurrence of an updating event once, the event-monitoring unit 120 continues the operation to monitor an updating event and, informs the search unit 130 from time to time whenever the event-monitoring unit 120 detects occurrence of an updating event.

Informed by the event-monitoring unit 120 that the updating event has occurred, the search unit 130 sets an area to serve as a search object on the basis of the window-range information received from the event-monitoring unit 120. If the search process is put in an executable state, for example, the search unit 130 further carries out a search process to search the search-object area immediately to detect an updated area. If a result of the search process indicates that an updated area exists in the area serving as a search object, the search unit 130 outputs display-screen data of the updated area to the transmission-side transmission/reception unit 112 in operation (2), and puts subsequent search processes in an unexecutable state.

Then, the transmission-side transmission/reception unit 112 encodes the display-screen data received from the search unit 130 and transmits the encoded data of the display screen to the reception-side transmission/reception unit 114 employed in the reception-side terminal 10b by way of the network 5 in operation (3). When operation (3) is finished, one process carried out by the transmission-side terminal 10a to present data of a display screen to the reception-side terminal 10b is completed.

Then, in the reception-side terminal 10b, the reception-side transmission/reception unit 114 receives the display-screen data of the updated area in operation (4), decodes the data and supplies a result of decoding to the picture-rendering unit 140 in operation (5). Subsequently, the picture-rendering unit 140 carries out a picture-rendering process on the result of decoding the data of a display area, and displays a result of the picture-rendering process on the display screen of the reception-side terminal 10b. Then, the picture-rendering unit 140 informs the reception-side transmission/reception unit 114 that the picture-rendering process has been completed in operation (6). Subsequently, the reception-side transmission/reception unit 114 generates a ready-for-reception signal and transmits the signal to the transmission-side transmission/reception unit 112 of the transmission-side terminal 10a by way of the network 5 in operation (7).

Subsequently, in the transmission-side terminal 10a, the transmission-side transmission/reception unit 112 receives the ready-for-reception signal from the reception-side transmission/reception unit 114 employed in the reception-side terminal 10b in operation (8), and passes on the signal to the search unit 130 in operation (9). Receiving the ready-for-reception signal, the search unit 130 puts a next search process in an executable state. Before the ready-for-reception signal is received, one, two or more new updating events may have occurred after the data of a display screen was transmitted in operation (3) as described above. The new updating events each cause a search-object area to be stocked on the search list 105. If a search-object area has been stocked on the search list 105 as such, the search unit 130 searches the stoked area to detect a new updated area without waiting for a notice to come from the event-monitoring unit 120. If a new updated area is detected, display-screen data of the new updated area is supplied to the transmission-side transmission/reception unit 112 in operation (2) and a subsequent search process is again put in an unexecutable state. Thereafter, the sequence of operations (3) to (9) and (2) described above is repeated.

As described above, under predetermined conditions, the transmission-side terminal 10a searches a search-object area on its own display screen to detect an updated area and then transmits display-screen data of the updated area to the reception-side terminal 10b, whereas the reception-side terminal 10b receives the display-screen data and then reproduces the data so that a display screen presented by the presenter in a data conference can be shared by both the terminals 10.

<4: Detailed Operations of Terminal Components>

The following description explains operations of main components employed in the transmission-side terminal 10a and the reception-side terminal 10b, which are implemented by the embodiment, in detail.

<4.1: Operations of the Event-Monitoring Unit>

Figure 4:
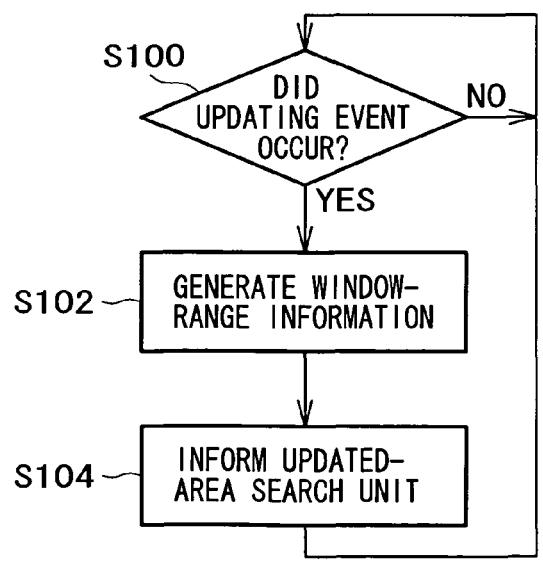
FIG. 4 shows a flowchart representing a sequence of operations carried out by an event-monitoring unit employed in the first embodiment.
Figure 5A:
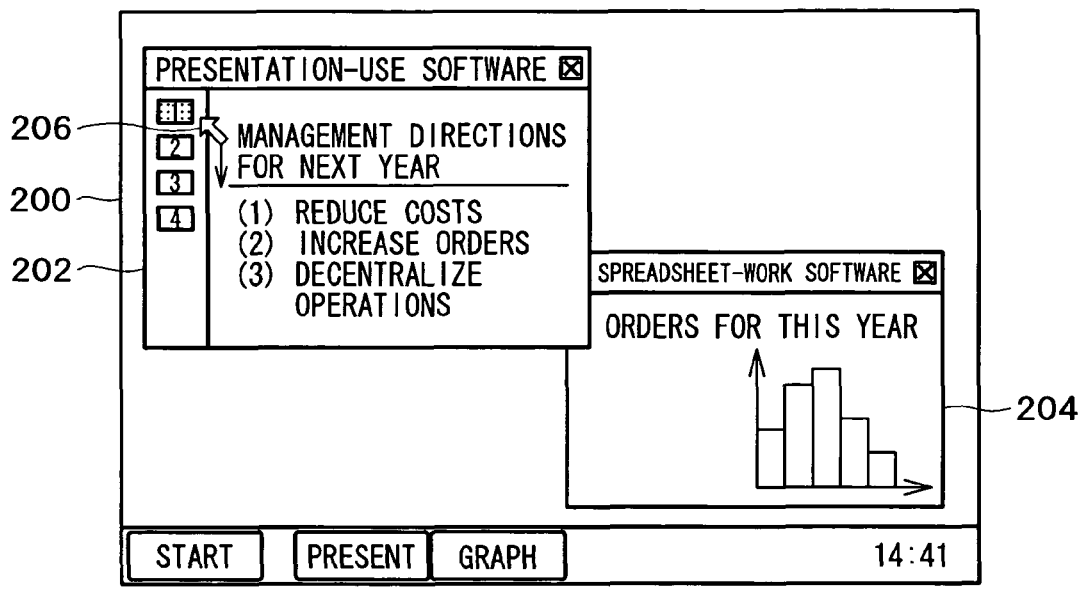
FIGS. 5A and 5B are explanatory diagrams referred to in describing a typical display screen of a transmission-side terminal provided by the first embodiment.
Figure 5B:
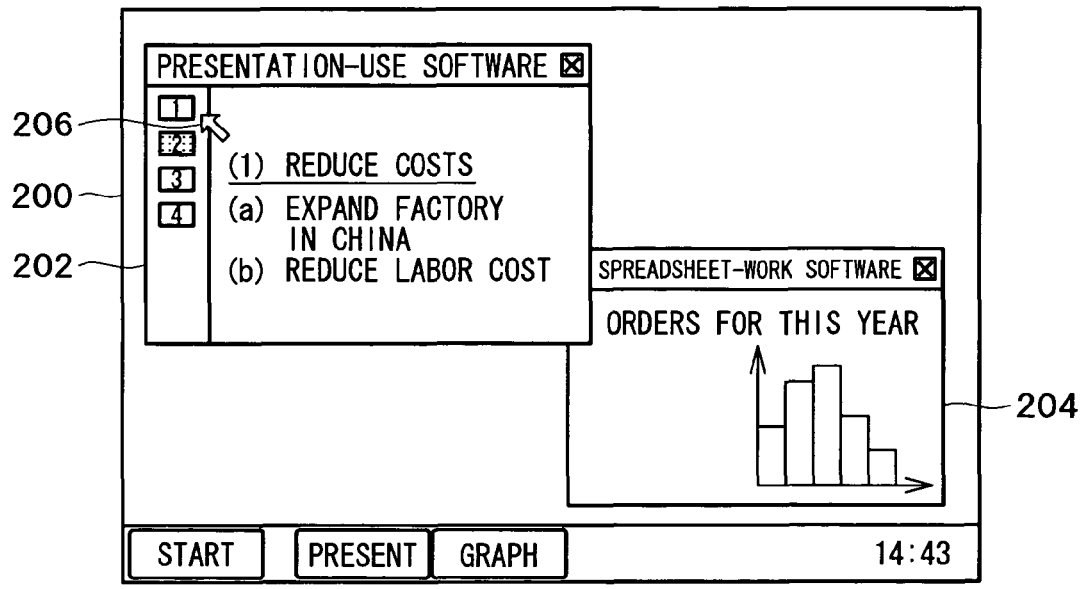
Figure 6:
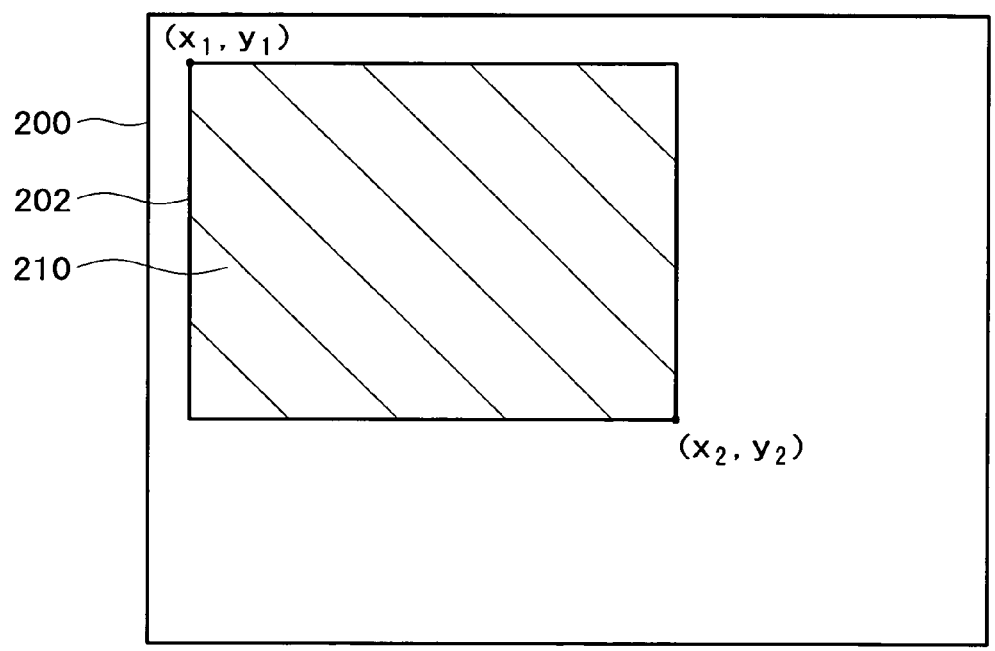
FIG. 6 is an explanatory diagram referred to in describing a typical search-object area appearing on a display screen of the transmission-side terminal and typical window-range information for the search-object area.

First of all, a sequence of operations carried out by the event-monitoring unit 120 employed in the transmission-side terminal 10a implemented by the embodiment is explained by referring to FIGS. 4 to 7. It is to be noted that FIG. 4 shows a flowchart representing a sequence of operations carried out by the event-monitoring unit 120 employed in the embodiment. FIGS. 5A and 5B are explanatory diagrams each referred to in describing a typical display screen of the transmission-side terminal 10a implemented by the embodiment. FIG. 6 is an explanatory diagram referred to in describing a typical search-object area appearing on a display screen of the transmission-side terminal 10a and typical window-range information for the search-object area.

The flowchart shown in FIG. 4 begins with a step S100 to determine whether or not an updating event has been detected. As described earlier, an updating event is an event that possibly causes a display screen of the transmission-side terminal 10a to be updated. To put it concretely, an updating event is considered to occur, for example, when the presenter carries out an operation such as an operation to click the mouse or an operation to press a key of the keyboard, or when an application is activated. Accompanying the occurrence of the updating event, a picture-rendering process such as processing to change a display screen may be carried out. In such a picture-rendering process, a window may be newly created, moved, opened, closed or deleted, or a presentation-use slide on a window is switched from one to another or contents of a presentation may be added to or erased from a window.

For this reason, the event-monitoring unit 120 is always monitoring the occurrence of an updating event in the transmission-side terminal 10a. An updating event occurs typically at the beginning of a presentation made by the presenter or in the course of the presentation. Typically, the event-monitoring unit 120 is capable of monitoring the occurrence of an updating event by, for example, keeping track of the state of activation of presentation-use software as evidenced by an access made by the CPU 102 and by detecting a signal generated by the input unit 106. If the occurrence of an updating event is detected in the monitoring process, the sequence of operations goes on to a step S102. If the occurrence of an updating event is not detected, on the other hand, the execution of the step S100 is carried out repeatedly to carry out the monitoring process continuously.

By giving some examples, the following description explains a process to update a display screen and the monitoring process carried out by the event-monitoring unit 120. As shown in FIG. 5A, for example, a display screen 200 of the transmission-side terminal 10a shows a window 202 of presentation-use software and a window 204 of spreadsheet-work software. From these windows, it is assumed that the presenter has been making a presentation. After explaining presentation-use slide (1) regarding 'Management Directions for Next Year' displayed on the display screen 200, the presenter changes the display to next presentation-use slide (2) by operating the mouse to move a pointer 206 to a mark for next presentation-use slide (2) and then clicking the mouse. By doing so, next presentation-use slide (2) regarding 'Reduce costs' is displayed on the window 202 of the presentation-use software as shown in FIG. 5B. As a result, the presentation-use slide appearing on a window seen on the display screen of the transmission-side terminal 10a as the window 202 of the presentation-use software is switched from one to another. In this case, the event-monitoring unit 120 typically detects the operation carried out by the presenter on the mouse as described above to determine that an updating event occurs.

Then, at the next step S102, information on a window range is generated. To put it in detail, at the step S102, when detecting the occurrence of the updating event, the event-monitoring unit 120 generates window-range information for the updating event.

By referring to FIG. 6 corresponding to the examples shown in FIGS. 5A and 5B, a process to generate information on a window range is explained in detail as follows. In the examples shown in FIGS. 5A and 5B, an updating event occurs as an event associated with the window 202 of the presentation-use software. Thus, the event-monitoring unit 120 generates window-range information for the display range of the window 202. To put it concretely, the display range of the window 202 can be identified by typically coordinates (x1, y1) of the left upper corner of the rectangular window 202 and coordinates (x2, y2) of the right lower corner of the same window 202 as shown in FIG. 6. Thus, the event-monitoring unit 120 typically generates the two sets of coordinates as the window-range information for the display range of the window 202.

Then, at the next step S104, the search unit 130 is informed of the fact that an updating event has occurred. In addition, at the step S104, the event-monitoring unit 120 supplies the information on the window range to the search unit 130. Thus, the event-monitoring unit 120 notifies the search unit 130 that an updating event has occurred and it is quite within the bounds of possibility that the contents of the rectangular display range identified by the information on the window range are being updated.

<4.2: Operations of the Search Unit>

Figure 7:
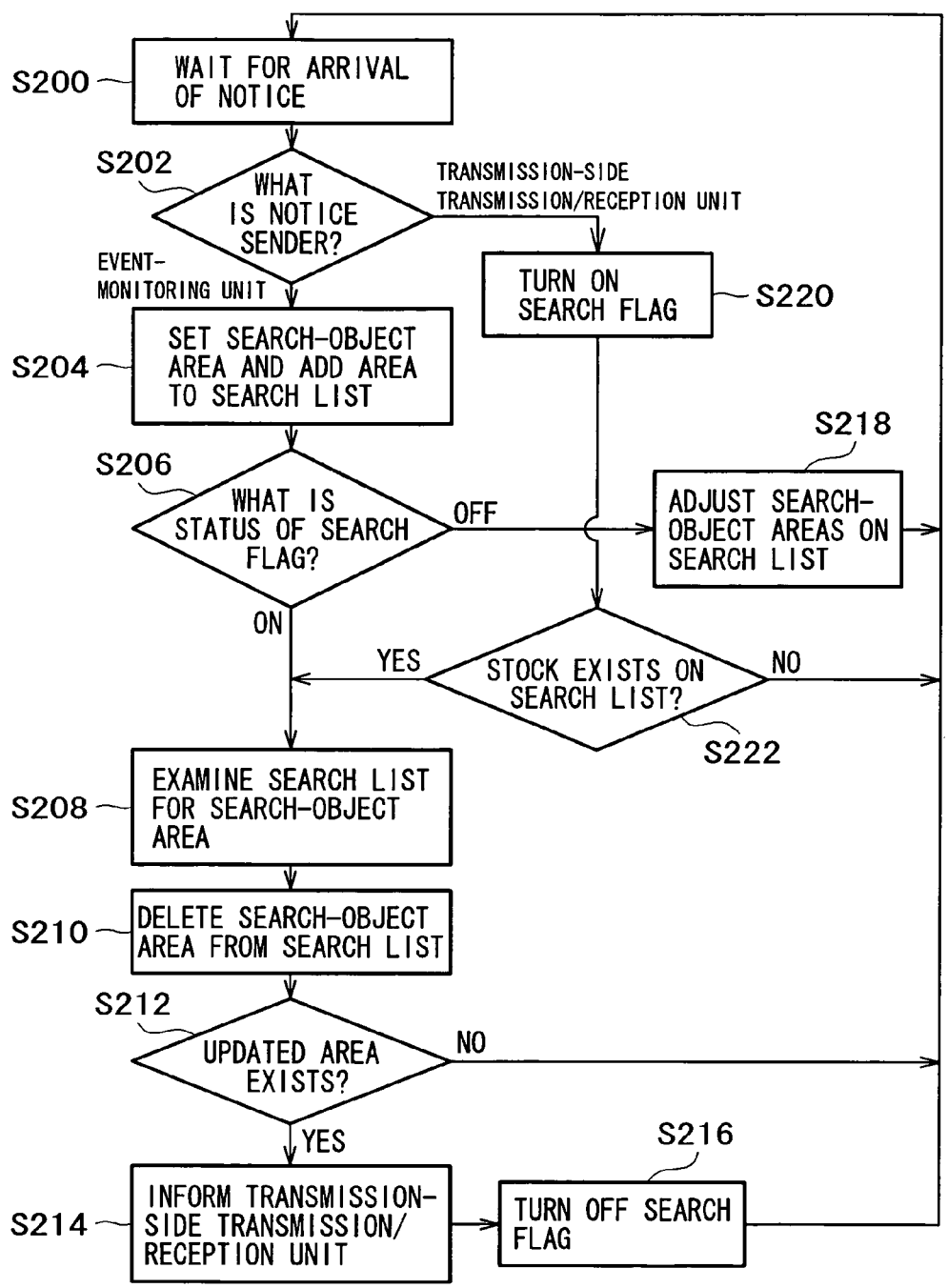
FIG. 7 shows a flowchart representing a sequence of operations carried out by a search unit provided by the first embodiment.
Figure 9A:
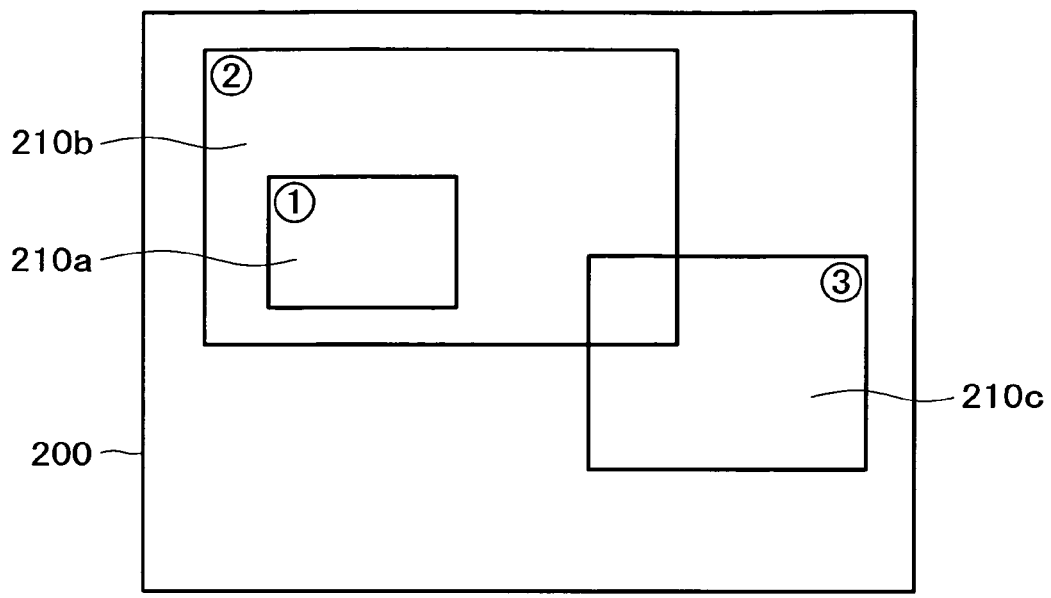
FIGS. 9A and 9B are explanatory diagrams referred to in describing a typical process to adjust search-object areas stocked on a search list of the transmission-side terminal implemented by the first embodiment.
Figure 9B:
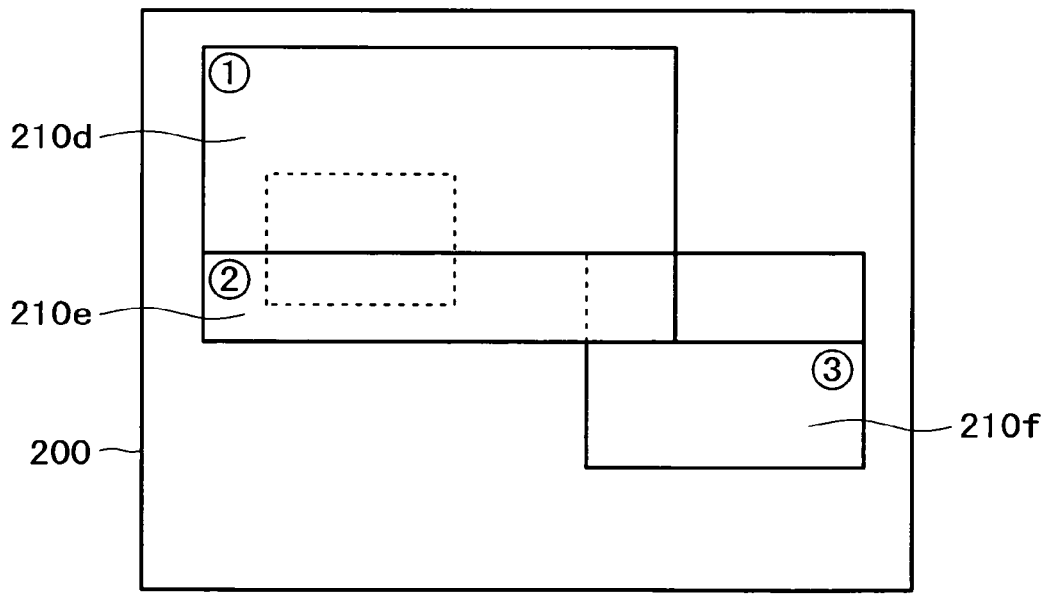

By referring to FIGS. 7 to 9, the following description explains a sequence of operations carried out by the search unit 130 employed in the transmission-side terminal 10a implemented by the embodiment. It is to be noted that FIG. 7 shows a flowchart representing a sequence of operations carried out by the search unit 130 provided by the embodiment. FIG. 8 is an explanatory diagram showing a typical area to serve as a search object and a typical updated area, which are included in a display screen of the transmission-side terminal 10*a* implemented by the embodiment. FIGS. 9A and 9B are explanatory diagrams referred to in describing a typical process to adjust search-object areas stocked on the search list 105 of the transmission-side terminal 10*a* implemented by the embodiment.

The flowchart shown in FIG. 7 begins with a step S200 at which the search unit 130 enters a state of waiting for a notice to be supplied by the event-monitoring unit 120 or transmitted by the reception-side terminal 10*b* by way of the transmission-side transmission/reception unit 112.

Then, as a notice is received, the flow of the sequence of operations goes on to a step S202 to determine whether the notice sender is the event-monitoring unit 120 or the transmission-side transmission/reception unit 112. If a notice of the occurrence of an updating event has been received from the event-monitoring unit 120, the flow of the sequence of operations goes on to a step S204. If a ready-for-reception signal has been received from the transmission-side transmission/reception unit 112 as the notice, on the other hand, the flow of the sequence of operations goes on to a step S220.

In order to make the explanation easy to understand, the following description is divided into the following two parts, i.e.

(1): A case in which the search unit 130 receives a notice from event-monitoring unit 120 at the step S202

(2): A case in which the search unit 130 receives a ready-for-reception signal as the notice from transmission-side transmission/reception unit 112 at the step S202

(1): A case in which the search unit 130 receives a notice from event-monitoring unit 120 at the step S202

First of all, at the step S204, the search-object-area management unit 132 employed in the search unit 130 sets an area to serve as a search object and records the area on the search list 105. In the operation carried out at the step S204, processing is also carried out to acquire window-range information for a window corresponding to an updating event from the event-monitoring unit 120 when the event-monitoring unit 120 notifies the search unit 130 that the updating event has occurred. The search object area added to the search list 105 as a newly recorded area to serve as a search object is set typically on the basis of the information on the range of the window.

The processing to set an area to serve as a search object is explained in more detail by giving a concrete example shown in FIG. 6. In the example shown in FIG. 6, pieces of window-range information (x1, y1) and (x2, y2) are generated for a window 202 for which an updating event has occurred. In this case, the search-object-area management unit 132 sets an area identified by the pieces of window-range information as a search-object area 210. The area identified by the pieces of window-range information is an area enclosed in a rectangular frame serving as the external edges of the window 202.

As described above, in this embodiment, the search-object-area management unit 132 sets only the range of the window 202, for which an updating event has occurred, as the search-object area 210. Thus, the range of the search-object area set by the search-object-area management unit 132 can be dynamically changed in accordance with the location and range of the window 202 for which an updating event has occurred. However, the processing to set an area to serve as a search object does not have to be carried out in the same way as the processing described above. For example, only a partial range of the window 202 can also be extracted and set as an area to serve as a search object. As another alternative, a fixed area can always be set as an area to serve as a search object without regard to the window for which an updating event has occurred. The fixed area can be the entire display screen 200 or a partial area enclosed in a predetermined frame extracted from the display screen 200.

Then, the flow of the sequence of operations goes on to a step S206 to determine whether the status of a search flag is on or off. The search-process control unit 136 turns the search flag on or off in order to respectively allow or disallow the search execution unit 134 to carry out a search process. If the status of the search flag is on, the search execution unit 134 is allowed to carry out a search process. In this case, the flow of the sequence of operations goes on to a step S208. If the status of the search flag is off, on the other hand, the search execution unit 134 is not allowed to carry out a search process. In this case, the flow of the sequence of operations goes on to a step S218.

At the step S208, the search list 105 stored in the storage unit 104 is searched for a search-object area recorded thereon. To put it in detail, the search execution unit 134 makes an access to the storage unit 104 and acquires information on the area to serve as a search object from the search list 105. Then, the search execution unit 134 makes an attempt to search the area serving as a search object to detect an updated area.

Subsequently, at the next step S210, the search-object area searched by the search execution unit 134 to detect an updated area as described above is deleted from the search list 105.

Then, the flow of the sequence of operations goes on to a step S212 at which a result of the search process carried out by the search execution unit 134 at the step S208 is evaluated to determine whether or not an updated area exists. If the result of the search process carried out by the search execution unit 134 at the step S208 indicates that an updated area has been detected, the flow of the sequence of operations goes on to a step S214. If the result of the search process carried out by the search execution unit 134 at the step S208 indicates that no updated area has been detected, on the other hand, the flow of the sequence of operations goes back to the step S200 at which the search unit 130 reenters the state of waiting for an arrival of a notice from an external source.

A concrete example of an updated area detected in the search process is explained as follows. As shown in FIG. 8, for example, two updated areas 220*a* and 220*b* have been detected. The updated area 220*a* located at the left upper corner of the window 202 displaying updated contents is a result of moving the pointer 206 to change the selected slide of a slide select portion as explained earlier by referring to FIGS. 5A and 5B. The range of the updated area 220*a* is identified by coordinates (x3, y3) and (x4, y4). On the other hand, the updated area 220*b* located at the center of the window 202 displaying updated contents is a result of switching the presentation-use slide from one to another as explained earlier by referring to FIGS. 5A and 5B. The range of the updated area 220*b* is identified by coordinates (x5, y5) and (x6, y6). As obvious from these examples, a plurality of updated areas 220 may be detected in a search process. In addition, since the range of an updated area is set at a minimum possible size containing updated contents of the display screen, the amount of display-screen data to be transmitted to the reception-side terminal 10*b* can be reduced.

At the S214, the transmission-side transmission/reception unit 112 is informed of the fact that an updated area has been detected. To put it concretely, the search unit 130 extracts the display-screen data from one, two or more updated areas detected in the search process, and supplies the data to the transmission-side transmission/reception unit 112.

Then, at the next step S216, the search flag is turned off. The search-process control unit 136 turns off the search flag to put subsequent search processes in an unexecutable state, that is, to prevent the search execution unit 134 from carrying out the subsequent search processes. Then, the flow of the sequence of operations goes back to the step S200 at which the search unit 130 reenters the state of waiting for an arrival of a notice from an external source.

At the step S218, on the other hand, search-object areas recorded on the search list 105 are adjusted. If the determination result obtained at the step S206 shows the off status of the search flag, a search process will not be carried out immediately on any of areas each to serve as a search object even if such areas have been stocked on the search list 105. Further, if the process to stock an area to serve as a search object on the search list 105 is carried out repeatedly while no search process is being performed, a plurality of areas each to serve as a search object will be stocked on the search list 105. In this case, at the step S218, the search-object-area management unit 132 carries out a process to adjust the areas each to serve as a search object in order to prevent portions of the search-object areas from overlapping each other.

The process to adjust the areas each to serve as a search object is explained in detail by giving concrete examples shown in FIGS. 9A and 9B as follows. Assume that, with a relatively small search-object area 210*a* stocked on the search list 105 in advance, a newly set search-object area 210*b* enclosing the whole of the search-object area 210*a* is further stocked on the search list 105 as shown in FIG. 9A. In this case, the search-object-area management unit 132 carries out a process to adjust the areas 210*a* and 210*b* each to serve as a search object by elimination of the search-object 210*a*, leaving only the search-object area 210*b* on the search list 105. Assume that a newly set search-object area 210*c* partially overlapping the search-object area 210*b* is further recorded. In this case, the search-object-area management unit 132 updates the search list 105 by, for example, newly recording three rectangular search-object areas 210*d*, 210*e* and 210*f*, which cover the entire ranges of the original search-object area 210*b* and the original search-object area 210*c* as shown in FIG. 9B.

By carrying out such a process to adjust areas each to serve as a search object in advance, an overlapping portion of the areas can be prevented from being searched a plurality of times in search processes, which are carried out later at the step S208 after the search processes are put in an executable state. Thus, the efficiency of the search process can be increased. It is to be noted that, in the end of this step, the flow of the sequence of operations goes back to the step S200 at which the search unit 130 reenters the state of waiting for an arrival of a notice from an external source.

(2): A case in which the search unit 130 receives a ready-for-reception signal as a notice from transmission-side transmission/reception unit 112 at the step S202

First of all, the search flag is turned on at the step S220. Operations are carried out at the step S220 and the following step when the search unit 130 receives a ready-for-reception signal from the reception-side terminal 10*b* by way of the transmission-side transmission/reception unit 112. A ready-for-reception signal is received from the reception-side terminal 10*b* by way of the transmission-side transmission/reception unit 112 typically when the reception-side terminal 10*b* completes a picture-rendering process on display-screen data transmitted by the transmission-side terminal 10*a* in an operation carried out after the step S214. The reception-side terminal 10*b* transmits the ready-for-reception signal to the transmission-side terminal 10*a* to inform the transmission-side terminal 10*a* that the picture-rendering process has been completed. Thus, after data of a display screen is transmitted to the reception-side terminal 10*b*, the search unit 130 puts the search flag in off status to set the search process in an inhibited or standby state till a ready-for-reception signal generated by the reception-side terminal 10*b* in response to the data of a display screen is received. With the search flag put in off status during this period, one, two or more updating events may occur, causing new areas each to serve as a search object to be set. However, no actual search process is carried out on the areas each to serve as a search object. The new areas each to serve as a search object are merely stocked on the search list 105. For this reason, at this step, the search-process control unit 136 turns on the search flag to put subsequent search processes in an executable state.

Then, at the next step S222, the search list 105 is examined to determine whether any areas each to serve as a search object have been stocked thereon. If no updating event has occurred during the inhibited or standby period of the search process so that no new area to serve as a search object has been set, no areas each to serve as a search object have been stocked on the search list 105. In this case, the flow of the sequence of operations goes back to the step S200 at which the search unit 130 reenters the state of waiting for an arrival of a notice from an external source. If one, two or more updating events have occurred during the inhibited or standby period of the search process so that one, two or more new areas each to serve as a search object have been set, on the other hands, the areas have been stocked on the search list 105. In this case, the flow of the sequence of operations goes on to the step S208.

At the step S208, the search list 105 stored in the storage unit 104 is searched for one, two or more search-object areas recorded thereon as described earlier. To put it in detail, the search execution unit 134 makes an access to the storage unit 104 and acquires information on the areas each to serve as a search object from the search list 105. Then, the search execution unit 134 searches each of the areas, which each serve as a search object, to detect an updated area. This time, however, the areas each serving as a search object have been properly adjusted as explained earlier by referring to FIGS. 9A and 9B so that the search execution unit 134 is capable of searching the rectangular search-object areas stocked on the search list 105 with ease at a high speed.

Thereafter, after the operations of the steps S210 to S216 are carried out, the flow of the sequence of operations goes back to the step S200 at which the search unit 130 reenters the state of waiting for an arrival of a notice from an external source as described before.

<4.3: Operations of the Transmission-Side Transmission/Reception Unit>

Figure 10:
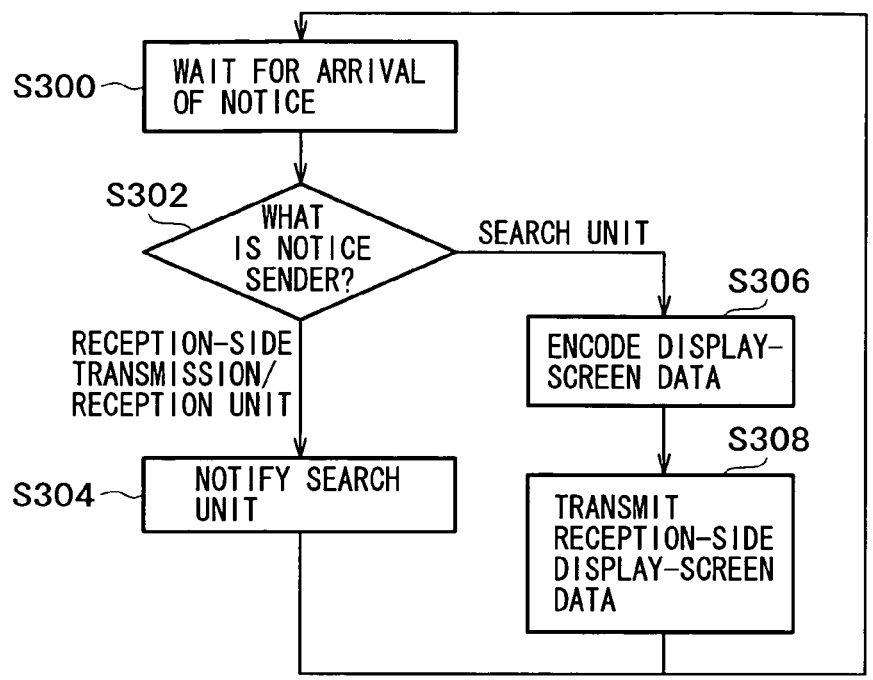
FIG. 10 shows a flowchart representing a sequence of operations carried out by a transmission-side transmission/reception unit employed in the transmission-side terminal implemented by the first embodiment.

By referring to FIG. 10, the following description explains a sequence of operations carried out by the transmission-side transmission/reception unit 112 employed in the transmission-side terminal 10*a* implemented by the embodiment. It is to be noted that FIG. 10 shows a flowchart representing the sequence of operations carried out by the transmission-side transmission/reception unit 112 employed in the transmission-side terminal 10*a* implemented by the embodiment.

As shown in FIG. 10, the flowchart begins with a step S300 at which the transmission-side transmission/reception unit 112 enters a state of waiting for a notice to be supplied by the search unit 130 or the reception-side transmission/reception unit 114 employed in the reception-side terminal 10b.

Then, as a notice is received, the flow of the sequence of operations goes on to a step S302 to determine whether the notice sender is the search unit 130 or the reception-side transmission/reception unit 114 employed in the reception-side terminal 10b. If the notice has been received from the search unit 130, the notice is a notice informing the transmission-side transmission/reception unit 112 that an updated area has been detected as well as a notice including display-screen data for the updated area. In this case, the flow of the sequence of operations goes on to a step S306. If a ready-for-reception signal has been received from the reception-side transmission/reception unit 114 of the reception-side terminal 10b as the notice, on the other hand, the flow of the sequence of operations goes on to a step S304.

At the step S304, the transmission-side transmission/reception unit 112 informs the search unit 130 that a ready-for-reception signal has been received from the reception-side transmission/reception unit 114 employed in the reception-side terminal 10b. Then, the sequence of operations goes back to the step S300 at which the transmission-side transmission/reception unit 112 reenters the state of waiting for an arrival of a notice from an external source as described before.

At the step S306, on the other hand, the transmission-side transmission/reception unit 112 encodes the data of display screen received from the search unit 130 as the display-screen data for the updated area by adoption of typically the MPEG method.

Then, at the next step S308, the transmission-side transmission/reception unit 112 transmits the display-screen data encoded at the step S306 to the reception-side terminal 10b by way of the network 5. After the operation carried out at this step is completed, the sequence of operations goes back to the step S300 at which the transmission-side transmission/reception unit 112 reenters the state of waiting for an arrival of a notice from an external source as described before.

<4.4: Operations of the Reception-Side Transmission/Reception Unit>

Figure 11:
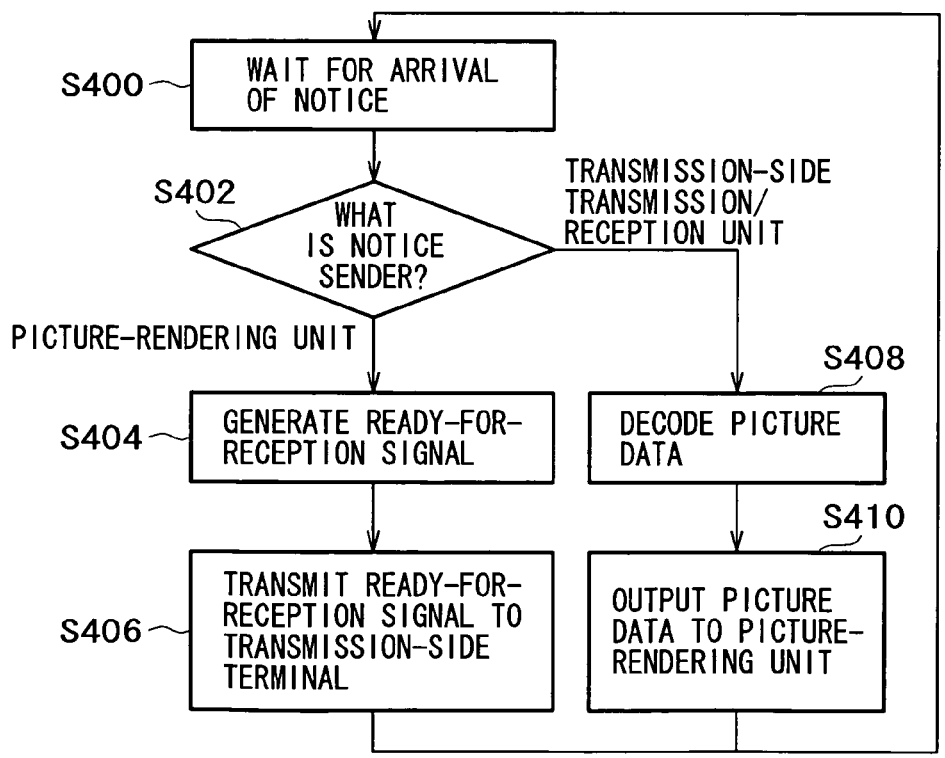
FIG. 11 shows a flowchart representing a sequence of operations carried out by a reception-side transmission/reception unit employed in a reception-side terminal implemented by the first embodiment.

By referring to FIG. 11, the following description explains a sequence of operations carried out by the reception-side transmission/reception unit 114 employed in the reception-side terminal 10b implemented by the embodiment. It is to be noted that FIG. 11 shows a flowchart representing the sequence of operations carried out by the reception-side transmission/reception unit 114 employed in the reception-side terminal 10b implemented by the embodiment.

As shown in FIG. 11, the flowchart begins with a step S400 at which the reception-side transmission/reception unit 114 enters a state of waiting for a notice to be supplied by the picture-rendering unit 140 or transmitted by the transmission-side transmission/reception unit 112 employed in the transmission-side terminal 10a.

[120]

Then, as a notice is received, the flow of the sequence of operations goes on to a step S402 to determine whether the notice sender is the picture-rendering unit 140 or the transmission-side transmission/reception unit 112 employed in the transmission-side terminal 10a. If the notice has been received from the picture-rendering unit 140, the notice is a notice informing the reception-side transmission/reception unit 114 that a picture-rendering process carried out on data of a display screen has been completed. In this case, the flow of the sequence of operations goes on to a step S404. If data of a display screen has been received from the transmission-side transmission/reception unit 112 of the transmission-side terminal 10a as the notice, on the other hand, the flow of the sequence of operations goes on to a step S408.

At the step S404, the reception-side transmission/reception unit 114 typically generates a ready-for-reception signal indicating that a picture-rendering process carried out on data of a display screen has been completed.

Then, at the next step S406, the reception-side transmission/reception unit 114 transmits the ready-for-reception signal generated at the step S404 to the transmission-side terminal 10a by way of the network 5. After the operation carried out at this step is completed, the sequence of operations goes back to the step S400 at which the reception-side transmission/reception unit 114 reenters the state of waiting for an arrival of a notice from an external source as described before.

At the step S408, on the other hand, the reception-side transmission/reception unit 114 decodes the display-screen data received from the transmission-side terminal 10a as display-screen data of an updated area.

Then, at the next step S410, the reception-side transmission/reception unit 114 supplies the display-screen data decoded at the step S408 to the picture-rendering unit 140. After the operation carried out at this step is completed, the sequence of operations goes back to the step S400 at which the reception-side transmission/reception unit 114 reenters the state of waiting for an arrival of a notice from an external source as described before.

<4.5: Operations of the Picture-Rendering Unit>

Figure 12:
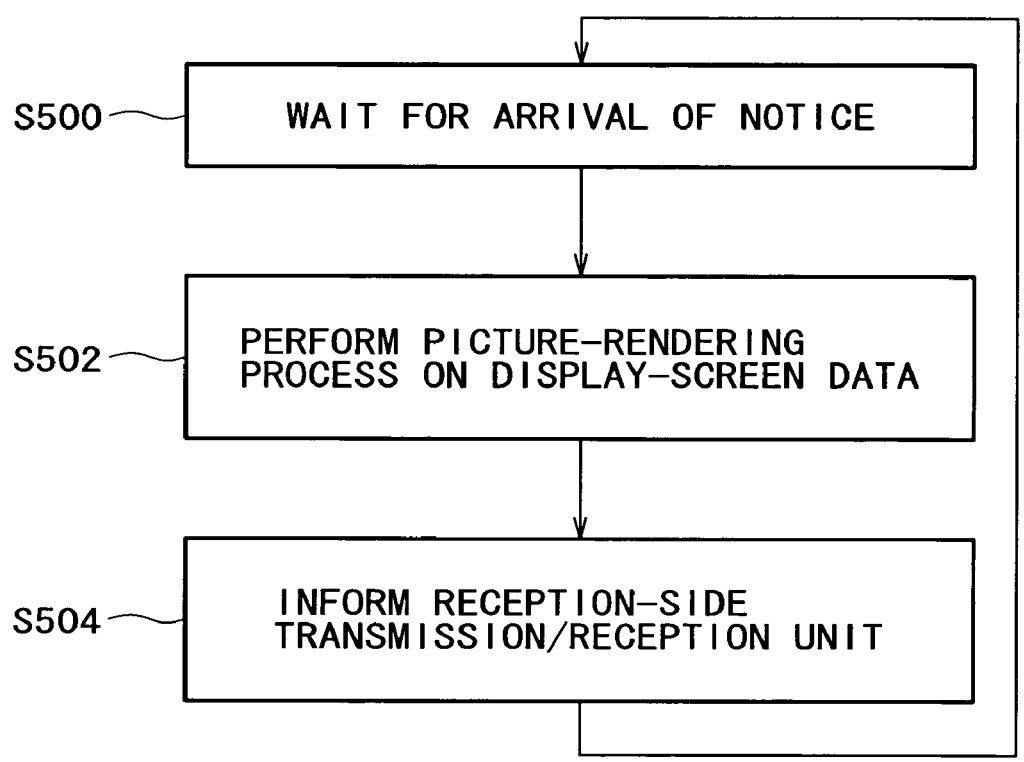
FIG. 12 shows a flowchart representing a sequence of operations carried out by a picture-rendering unit implemented by the first embodiment.

By referring to FIG. 12, the following description explains a sequence of operations carried out by the picture-rendering unit 140 employed in the reception-side terminal 10b implemented by the embodiment. It is to be noted that FIG. 12 shows a flowchart representing the sequence of operations carried out by the picture-rendering unit 140 employed in the reception-side terminal 10b implemented by the embodiment.

As shown in FIG. 12, the flowchart begins with a step S500 at which the picture-rendering unit 140 enters a state of waiting for data of a display screen to be supplied by the reception-side transmission/reception unit 114.

As data of a display screen is received from the reception-side transmission/reception unit 114, the flow of the sequence of operations goes on to a step S502 at which the picture-rendering unit 140 carries out a picture-rendering process based on the data of a display screen. Then, the picture-rendering unit 140 displays a result of the picture-rendering process on the display screen of the display unit 108 employed in the reception-side terminal 10b. At that time, typically, only a specific portion of the display screen is updated and the rest is left as it is. The specific portion corresponds to an updated area, which has been updated in the transmission-side terminal 10a. As a result of carrying out such a picture-rendering process based on the display-screen data received from the transmission-side terminal 10a, sharing of a display screen by the transmission-side terminal 10a and the reception-side terminal 10b can be realized.

Then, at the next step S504, the picture-rendering unit 140 informs the reception-side transmission/reception unit 114 that the picture-rendering process based on the data of a display screen has been completed. After the operation carried out at this step is completed, the sequence of operations goes back to the step S500 at which the reception-side transmission/reception unit 114 reenters the state of waiting for next data of a display screen to be supplied by the reception-side transmission/reception unit 114.

<5: Data-Conference Method>

Figure 13:
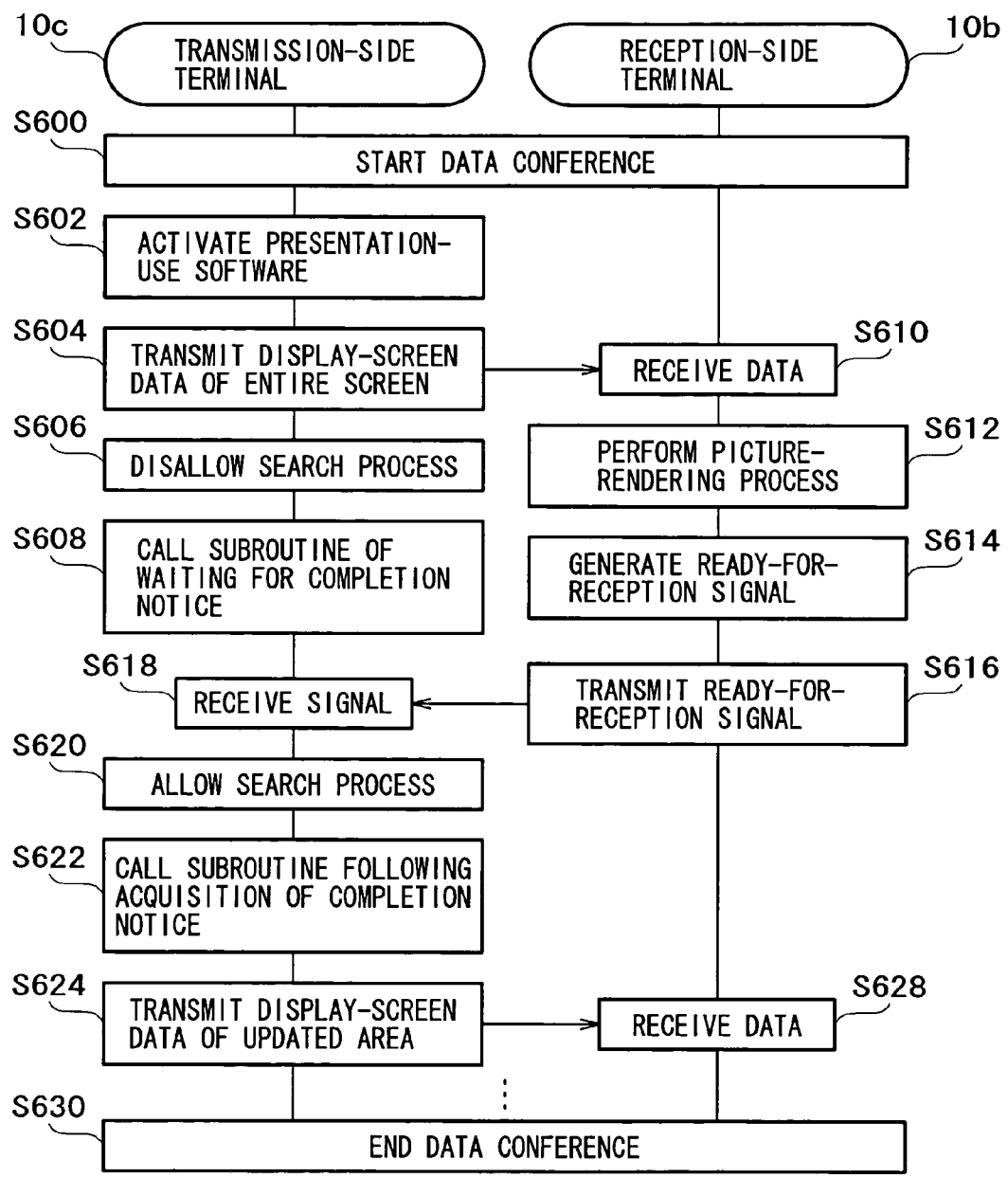
FIG. 13 shows a flowchart representing a data-conference method adopted in the first embodiment.
Figure 14:
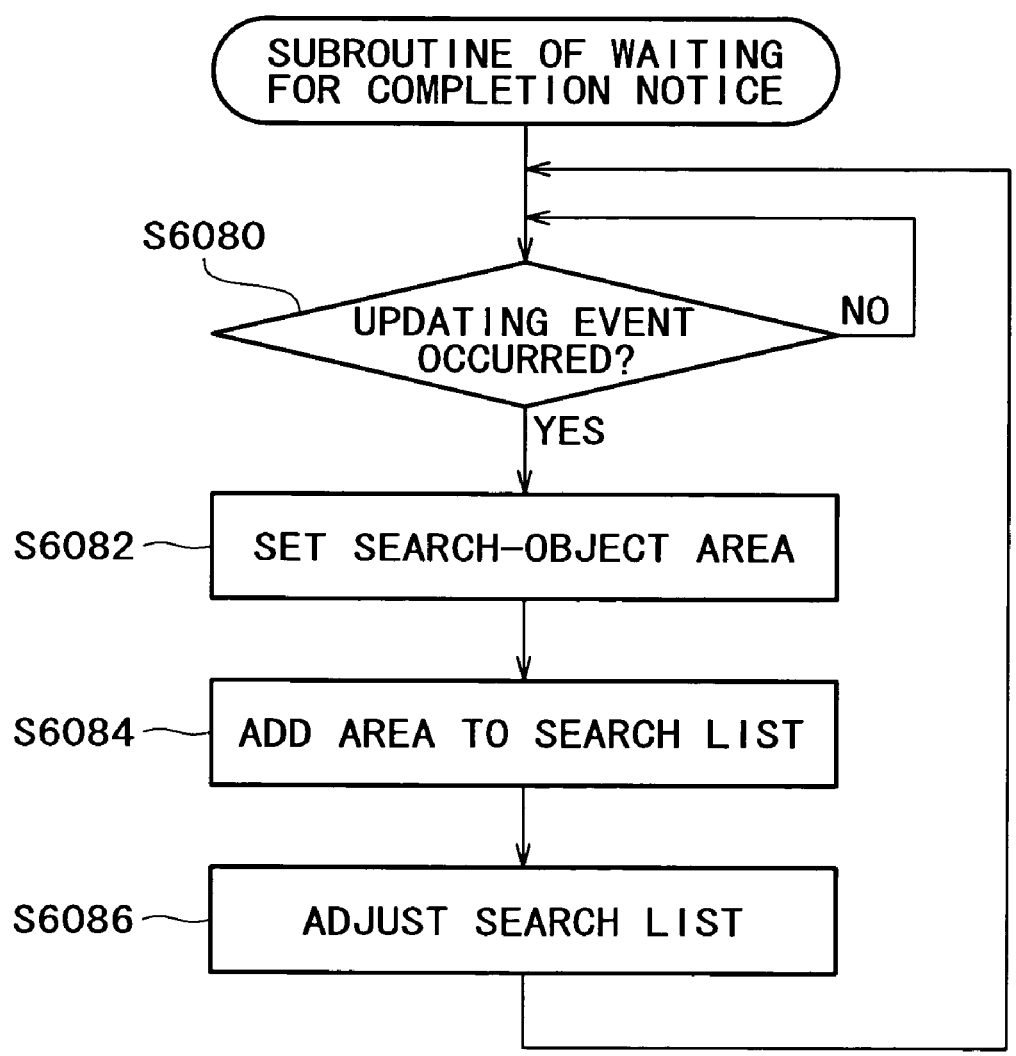
FIG. 14 shows a flowchart representing a subroutine of waiting for a notice of completion included in the data-conference method adopted in the first embodiment.
Figure 15:
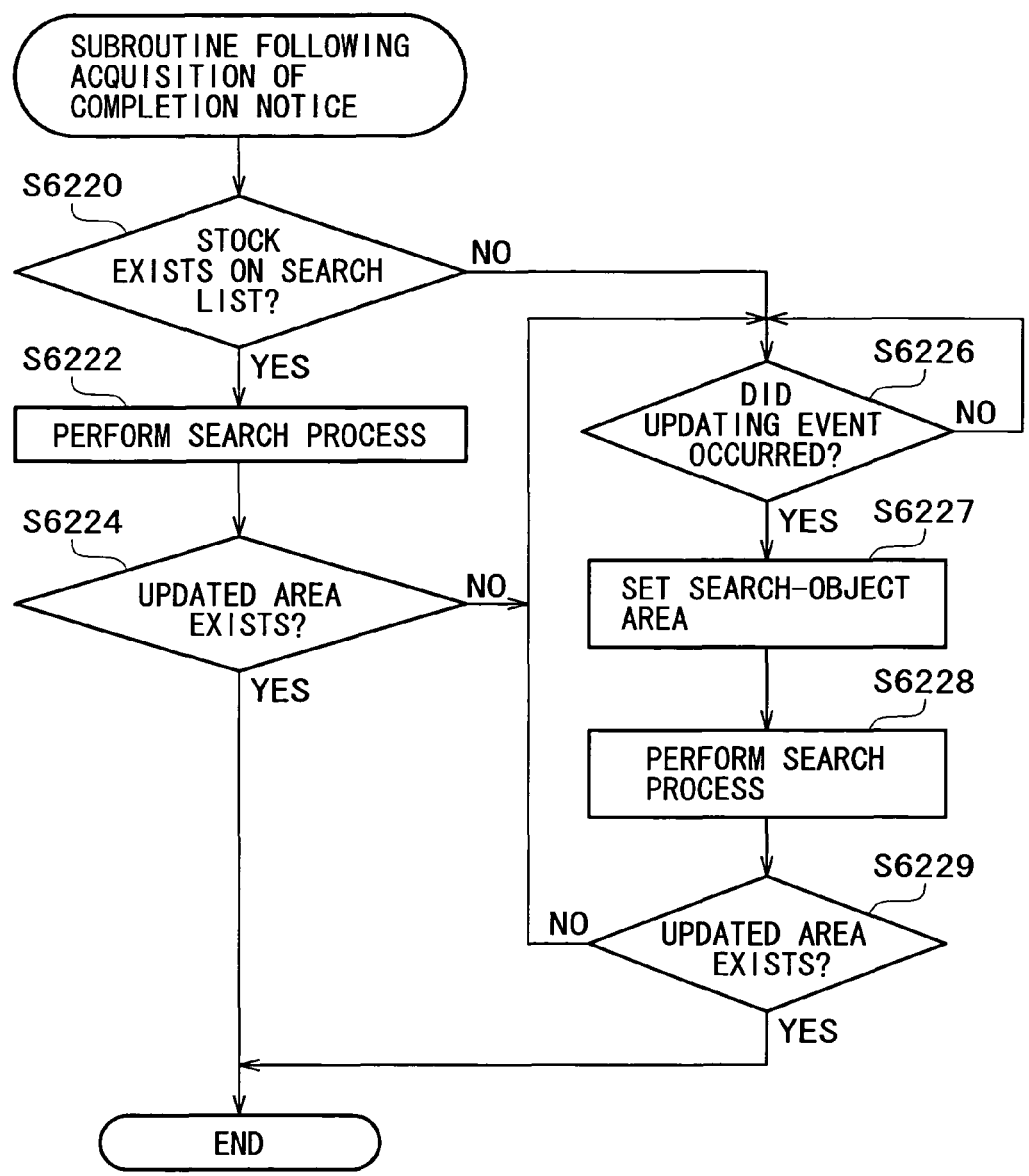
FIG. 15 shows a flowchart representing a subroutine following reception of a notice of completion included in the data-conference method adopted in the first embodiment.

By referring to FIGS. 13 to 15, the following description explains a data-conference method adopted in the embodiment implementing the data-conference system 1 described above. It is to be noted that FIG. 13 shows a flowchart representing the data-conference method adopted in the embodiment. FIG. 14 shows a flowchart representing a subroutine included in the flowchart representing the data-conference method adopted in the embodiment as a subroutine of waiting for a notice of completion. FIG. 15 shows a flowchart representing a subroutine included in the flowchart representing the data-conference method adopted in the embodiment as a subroutine following acquisition of a notice of completion.

The flowchart shown in FIG. 13 begins with a step S600 at which a data conference is started. As preparations of the transmission-side terminal 10a and the reception-side terminal 10b are completed, the data-conference system 1 enters a state allowing data to be exchanged between the transmission-side terminal 10a and the reception-side terminal 10b by the way of the network 5.

Then, at the next step S602, the presentation-use software of the transmission-side terminal 10a is activated. The presenter activates the presentation-use software installed in the transmission-side terminal 10a as software required for making a presentation. When activated, the presentation-use software retrieves a data file containing contents of the presentation. As a result, a window of the presentation-use software is typically displayed on the display screen of the transmission-side terminal 10a, and an initial presentation screen is displayed in the window.

Subsequently, at the next step S604, the transmission-side terminal 10a transmits data of its entire display screen or data of the initial presentation screen appearing on the window of the presentation-use software to the reception-side terminal 10b by way of the network 5. Before transmitting the data to the reception-side terminal 10b, the data is encoded.

Then, at the next step S606, the subsequent search process of the transmission-side terminal 10a is put in an unexecutable state by setting the search flag in off status typically until a ready-for-reception signal generated in the reception-side terminal 10b in response to the display-screen data transmitted to the reception-side terminal 10b at the step S604 is received from the reception-side terminal 10b. In this way, next screen-display data is not transmitted to the reception-side terminal 10b till such a ready-for-reception signal is received from the reception-side terminal 10b. Thus, a new updating event generated in the transmission-side terminal 10a is not subjected to a search process but is merely put in a state of being ready for a search process.

Subsequently, at the next step S608, the transmission-side terminal 10a executes a subroutine of waiting for a notice of completion. To be more specific, the transmission-side terminal 10a enters a state of waiting for a ready-for-reception signal to be transmitted by the reception-side terminal 10b as the notice of completion. While waiting for such a notice of completion, the transmission-side terminal 10a executes the subroutine also to carry out a job, which is explained by referring to the flowchart shown in FIG. 14.

The flowchart shown in FIG. 14 begins with a step S6080 at which occurrence of an updating event is monitored. To put it in detail, at the step S6080, the event-monitoring unit 120 is continuously monitoring occurrence of an updating event in the transmission-side terminal 10a all the time. As an updating event occurs, the flow of the subroutine goes on to a step S6082.

At the step S6082, a search-object area for the updating event is set. To be more specific, the event-monitoring unit 120 first creates information on the range of a window corresponding to the detected updating event. Then, the search-object-area management unit 132 sets a rectangular area of a display screen as the area to serve as a search object. The rectangular area is an area identified by the information on the range of the window.

Subsequently, at the next step S6084, the area to serve as a search object is stocked on the search list 105. To put it concretely, at the step S6084, the search-object-area management unit 132 records the area to serve as a search object on the search list 105 by adding information on the area to the search list 105. It is to be noted that, at this point of time, the search execution unit 134 is put in a state of not being allowed to carry out a search process. Thus, the area to serve as a search object is not subjected to a search process right away. As a result, no new data of a display screen is transmitted to the reception-side terminal 10b either.

Then, at the next step S6086, search-object areas recorded on the search list 105 are adjusted. To be more specific, at the step S6086, the search-object-area management unit 132 carries out a process to adjust the search-object areas recorded on the search list 105 in order to prevent portions of the areas from overlapping each other in case the areas each to serve as a search object include portions overlapping each other. After the operation of this step is ended, the flow of the subroutine goes back to the step S6080 to repeat the operations of the steps S6080 to S6086. The operations of the steps S6080 to S6086 are carried out repeatedly till a ready-for-reception signal is received from the reception-side terminal 10b.

By the way, while the transmission-side terminal 10a is executing the subroutine of waiting for a notice of completion as described above, the reception-side terminal 10b carries out operations at steps S610 to S616 of the flowchart shown in FIG. 13.

To put it in detail, first of all, at the step S610, the reception-side terminal 10b receives the initial display-screen data transmitted by the transmission-side terminal 10a. Then, at the next step S612, the data of the initial display screen is decoded and then subjected to a picture-rendering process. Thus, a conference participant using the reception-side terminal 10b is capable of browsing the initial display screen. Subsequently, at the next step S614, after the picture-rendering process carried out on the data of the initial display screen is completed, a ready-for-reception signal is generated. The ready-for-reception signal is a signal indicating that the picture-rendering process carried out on the data of the initial display screen has been completed. Then, at the next step S616, the reception-side terminal 10b transmits the ready-for-reception signal to the transmission-side terminal 10a by way of the network 5.

As a result, as the transmission-side terminal 10a receives the ready-for-reception signal transmitted by the reception-side terminal 10b by way of the network 5 at a step S618, the execution of the subroutine of waiting for a notice of completion at the step S608 is terminated.

Then, at the next step S620, the search process of the transmission-side terminal 10a is permitted. The reception of the ready-for-reception signal generated by the reception-side terminal 10b in response to the data of the initial display screen leads the transmission-side terminal 10a to determination that the reception-side terminal 10b is now capable of properly processing data of a new display screen. Thus, at this step, the search flag is turned on to put a subsequent search process in an executable state. As a result, at the subsequent steps, a search process can be carried out on an area to serve as a search object if the area has already been stocked on the search list 105 or the area is newly set.

Subsequently, at the next step S622, the transmission-side terminal 10a calls a subroutine following acquisition of a completion notice. The subroutine following acquisition of a completion notice is a subroutine executed at the step S622 after reception of a ready-for-reception signal. The subroutine executed by the transmission-side terminal 10a after reception of a completion notice is explained by referring to a flowchart shown in FIG. 15 as follows.

The flowchart shown in FIG. 15 begins with a step S6220 to determine whether or not an area to serve as a search object has been stocked on the search list 105. If an area to serve as a search object has been stocked on the search list 105, the flow of the subroutine goes on to a step S6222. If no area to serve as a search object has been stocked on the search list 105, on the other hand, the flow of the subroutine goes on to a step S6226.

At the step S6222, search-object areas already stocked on the search list 105 are subjected to a search process. To put it in detail, at the step S6222, the search execution unit 134 carries out a search process to compare display-screen data transmitted previously with the present display-screen data for each of the one, two or more search-object areas already stocked on the search list 105.

Then, the flow of the subroutine goes on to a step S6224 to determine whether or not a result of the comparison carried out at the step S6222 indicates that an updated area exists. If the result of the comparison indicates that an updated area has been detected, the search execution unit 134 extracts the present screen-display data of the search-object area including the detected updated area and supplies the extracted present screen-display data to the transmission-side transmission/reception unit 112, ending the execution of the subroutine following reception of a completion notice. If the result of the comparison indicates that no updated area has been detected, on the other hand, the flow of the subroutine goes on to a step S6226.

At the step S6226, occurrence of an updating event is monitored. The operation of this step is carried out if the comparison result obtained at the step S6224 indicates that no updated area has been detected as described above, or if the determination result obtained at the step S6220 indicates that no search-object area has been recorded on the search list 105. To put it in detail, at the step S6226, the event-monitoring unit 120 is continuously monitoring occurrence of an updating event in the transmission-side terminal 10a. As the occurrence of an updating event is detected, the flow of the subroutine goes on to a step S6227.

At the step S6227, a search-object area for which the updating event has occurred is set. To put it in detail, at this step, the event-monitoring unit 120 generates information on the range of a window for the detected updating event. Then, the search-object-area management unit 132 typically sets a rectangular area of a display screen identified by the information on the range of a window as the object to serve as a search object. It is to be noted that, at this point of time, the search execution unit 134 has been put in a state of being allowed to carry out a search process. Thus, the search-object area set at the step S6227 is immediately subjected to a search process at the next step S6228. This subroutine is thus different from the subroutine of waiting for a notice of completion in that, a search-object area set at the step S6082 of the subroutine of waiting for a notice of completion is merely recorded on the search list 105 instead of being immediately subjected to a search process.

At the step S6228, the search-object area set at the step S6227 is subjected to a search process as described above. To put it in detail, at the step S6228, the search execution unit 134 carries out a search process to compare display-screen data transmitted previously with the present display-screen data for the search-object area set at the step S6227.

Then, the flow of the subroutine goes on to a step S6229 to determine whether or not a result of the comparison carried out at the step S6228 indicates that an updated area exists. If the result of the comparison indicates that an updated area has been detected, the search execution unit 134 extracts the present screen-display data of the search-object area including the detected updated area, and supplies the extracted present screen-display data to the transmission-side transmission/reception unit 112, ending the execution of the subroutine following reception of a completion notice. If the result of the comparison indicates that no updated area has been detected, on the other hand, the flow of the subroutine goes back to the step S6226 to repeat the operations of the steps S6226 to S6229 described above. The operations of the steps S6226 to S6229 are carried out repeatedly till an updated area is detected. The description given above explains the subroutine following reception of a completion notice.

After calling the subroutine following reception of a completion notice, the flow of the sequence of operations goes on to a step S624 as shown in FIG. 13. At the step S624, the transmission-side terminal 10a transmits the display-screen data of the updated area to the reception-side terminal 10b. To put it in more detail, the transmission-side terminal 10a typically decodes the display-screen data of the updated area detected as described above before transmitting the data to the reception-side terminal 10b by way of the network 5. Typically, the display-screen data transmitted at this step is only the data of an updated portion of the previously transmitted display-screen data. Thus, the amount of the display-screen data transmitted at this step is smaller than the amount of the entire display-screen data transmitted at the step S604. As a result, the amount of the decode and transmission processing carried out by the transmission-side terminal 10a and, hence, the amount of the reception and other processing carried out by the reception-side terminal 10b are small loads borne by the transmission-side terminal 10a and the reception-side terminal 10b respectively.

Then, the transmission-side terminal 10a carries out subsequent operations almost the same as those of the steps S606 to S624 repeatedly till the data conference is ended at a step S630. However, the reception-side terminal 10b carries out operations different from those of the steps S610 to S616 in response to the subsequent operations. For example, at the step S628, the reception-side terminal 10b receives only the display-screen data of the updated area so that only the display-screen data of the updated area is subjected to a picture-rendering process to update the display screen, leaving the rest of the screen as it is. That is to say, the rest of the display-screen received previously remains unchanged.

As described above, while the data conference is being carried forward, the transmission-side terminal 10a transmits display-screen data of updated areas on the display screen to the reception-side terminal 10b and the reception-side terminal 10b reproduces the display-screen data of the updated areas repeatedly. Thus, a presented screen switched from one to another from time to time in the transmission-side terminal 10a can be shared by the reception-side terminal 10b.

Second Embodiment

The following description explains a data conference system 1 implemented by a second embodiment and a data conference method adopted in the data-conference system 1. The data-conference system 1 implemented by the second embodiment is different from the data-conference system 1 implemented by the first embodiment in that the latter data-conference system 1 employs a plurality of reception-side terminals 10*b*. Otherwise, the latter data-conference system 1 has all but the same functions and configuration as those of the former data-conference system 1 so that it is not necessary to repeat their explanations.

Figure 16:
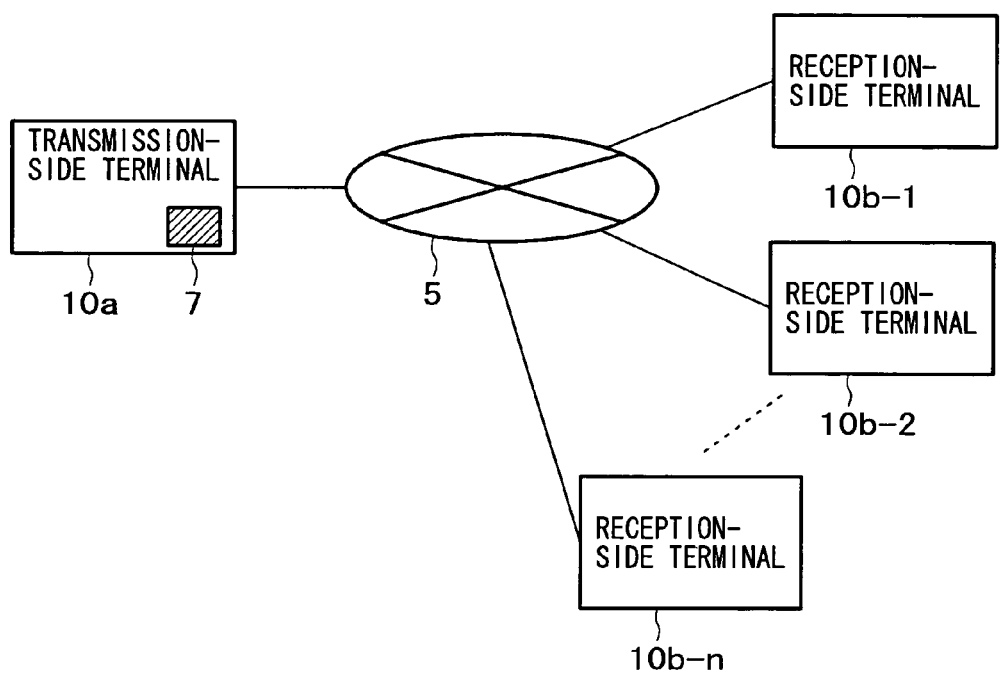
FIG. 16 is a block diagram showing a rough configuration of the data-conference system implemented by a second embodiment.

First of all, the entire configuration of the data-conference system 1 implemented by this embodiment is explained by referring to FIG. 16. It is to be noted that FIG. 16 is a block diagram showing a rough configuration of the data-conference system 1 implemented by this embodiment.

As shown in FIG. 16, the data-conference system 1 implemented by this embodiment typically includes main components such as one transmission-side terminal 10*a*, a plurality of reception-side terminals 10*b*-1, 10*b*-2, . . . and 10*b*-*n* and a network 5 connecting the transmission-side terminal 10*a* to the reception-side terminals 10*b*-1, 10*b*-2, . . . and 10*b*-*n*. In the following description, the reception-side terminals 10*b*-1, 10*b*-2, . . . and 10*b*-*n* are also denoted by reference numeral 10*b*, which is a generic reference numeral for them, in some cases.

The transmission-side terminal 10*a* transmits data of its own display screen to each of the reception-side terminals 10*b*. On the other hand, the reception-side terminals 10*b* each receive the data of the display screen and carry out a picture-rendering process on the data. At a point of time the picture-rendering process is completed, the reception-side terminals 10*b* each transmit a ready-for-reception signal to the transmission-side terminal 10*a*. Thus, the transmission-side terminal 10*a* receives the ready-for-reception signals from the reception-side terminals 10*b* with different timings. The timings to receive the ready-for-reception signals are different from each other because the reception-side terminals 10*b* have different processing powers and because the speed of communication through the network 5 as well as the traffic through the network 5 vary in dependence on the reception-side terminal 10*b*.

In order to cope with the differences in timing to receive a ready-for-reception signal, the transmission-side terminal 10*a* provided by this embodiment typically sets reception of ready-for-reception signals from all the reception-side terminals 10*b* as the condition for putting the search process in an executable state.

Figure 17:
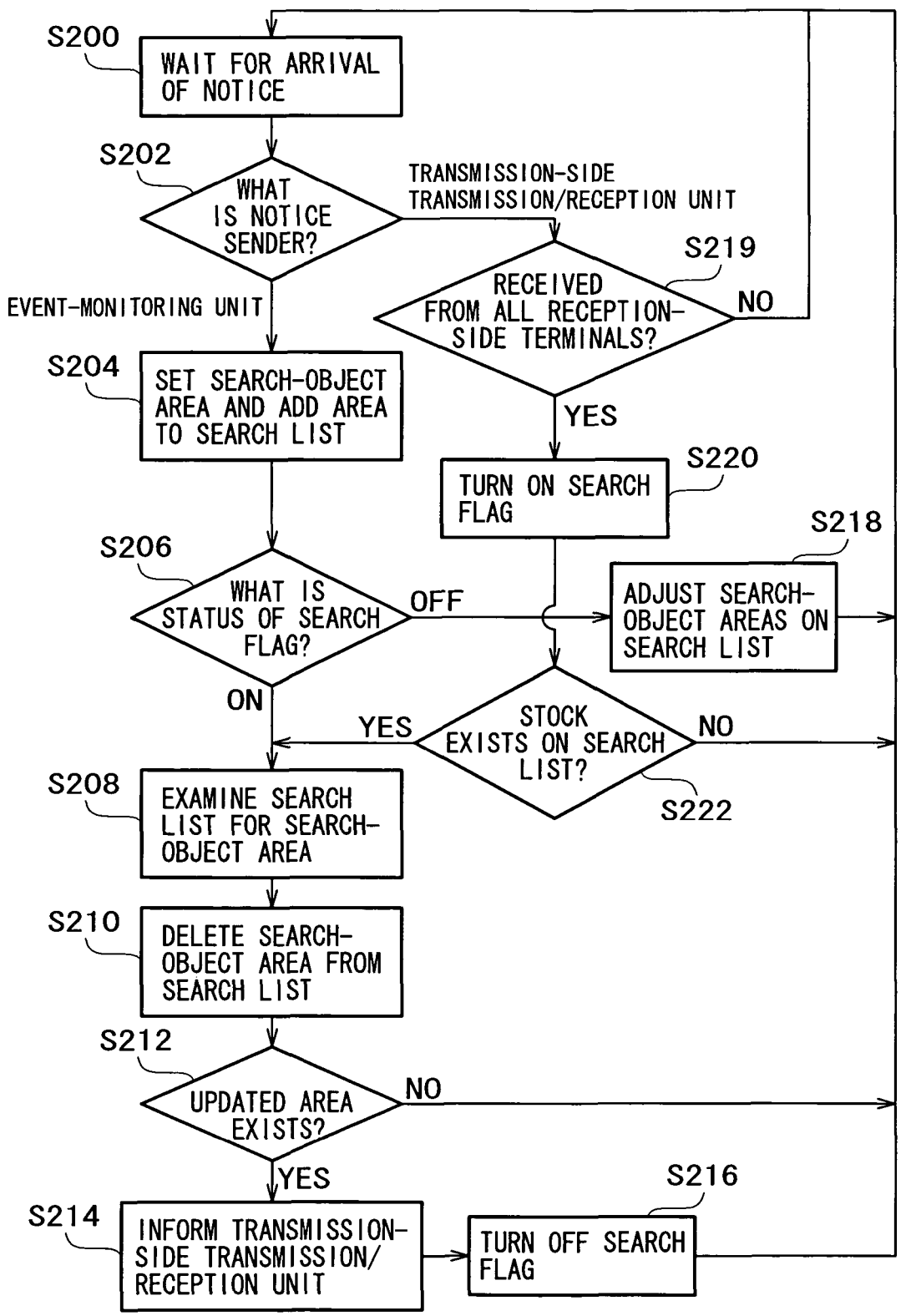
FIG. 17 shows a flowchart representing a sequence of operations carried out by a search unit provided by the second embodiment.

By referring to FIG. 17, the following description explains a sequence of operations carried out by the search unit 130 employed in the transmission-side terminal 10*a* implemented by this embodiment. It is to be noted that FIG. 17 shows a flowchart representing a sequence of operations carried out by the search unit 130 employed in the transmission-side terminal 10*a* implemented by this embodiment.

The sequence of operations carried out by the search unit 130 in this embodiment as shown in FIG. 17 is different from the sequence of operations carried out by the search unit 130 in the first embodiment as shown in FIG. 7 in that the sequence provided by this embodiment has an additional step S219. Since the rest of the sequence provided by this embodiment is identical with the sequence provided by the first embodiment, its explanation is not repeated.

The operation carried out at the step S219 is explained as follows. Assume for example that the search-process control unit 136 receives a notice, which indicates that a ready-for-reception has been received from a reception-side terminal 10*b*, from the transmission-side transmission/reception unit 112. In this case, at the step S219, the search-process control unit 136 examines the ready-for-reception signal to determine whether or not the signal has been received from the last reception-side terminal 10*b*. In other words, the search-process control unit 136 determines whether or not ready-for-reception signals have been received from all the reception-side terminals 10*b* on the basis of the present ready-for-reception signal. If a result of the determination indicates that ready-for-reception signals have been received from all the reception-side terminals 10*b*, the flow of the sequence of operations goes on to the step S220 at which the search flag is turned on to put the subsequent search process in an executable state. If the result of the determination indicates that ready-for-reception signals have not been received from all the reception-side terminals 10*b*, on the other hand, the flow of the sequence of operations goes back to the step S200 at which the search unit 130 enters a state of waiting for a notice to be supplied by the event-monitoring unit 120 or a ready-for-reception signal to be transmitted by another reception-side terminal 10*b* by way of the transmission-side transmission/reception unit 112. Thus, the search flag remains in the off status sustaining the search process in an unexecutable state. It is to be noted that, in place of the search-process control unit 136 employed in the search unit 130, the transmission-side transmission/reception unit 112 may also determine whether or not ready-for-reception signals have been received from all the reception-side terminals 10*b* at the step S219.

In addition, the transmission-side terminal 10*a* may also be provided typically with the following additional error-handling function not shown in the figure. If a ready-for-reception signal is not received from a reception-side terminal 10*b* even after a predetermined period of time has lapsed since the transmission of data of a display screen, for example, the transmission-side terminal 10*a* determines that an error has been generated in the communication between the transmission-side terminal 10*a* and the reception-side terminal 10*b*, and then carries out an error-handling process. To put it concretely, in the error-handling process, the transmission-side terminal 10*a* typically ignores a reception-side terminal 10*b* that did not transmit a ready-for-reception signal as a response to the data of the display screen, and allows a next search process to be carried out. As an alternative, the transmission-side terminal 10*a* retransmits the data of the display screen to such a reception-side terminal 10*b*. In this way, the operation of the data-conference system 1 can be assured.

By referring to FIG. 18, the following description explains a data-conference method provided by the embodiment implementing the data-conference system 1 having the configuration described above. FIG. 18 shows a flowchart representing the data-conference method provided by this embodiment. It is to be noted that FIG. 18 shows only focused characteristic portions, which are different from the flowchart representing the data-conference method provided by the first embodiment. Since the rest of the data-conference method provided by this embodiment is all but the same as the data-conference method provided by the first embodiment, its explanation is not repeated.

The flowchart shown in FIG. 18 begins with a step S700 at which the transmission-side terminal 10*a* typically transmits data of an initial screen or the display-screen data of an updated area to all the reception-side terminals 10*b* at the same time. Then, at the next step S702, the transmission-side terminal 10*a* turns off the search flag to put the search process in an unexecutable state. Subsequently, at the next step S704, the transmission-side terminal 10*a* calls the subroutine of waiting for a notice of completion.

At steps S706-1, 2, . . . and n, on the other hand, the reception-side terminals 10*b* receive and decode the display-screen data transmitted at the step S700. Then, at the following steps S708-1, 2, . . . and n, the reception-side terminals 10b carries out a picture-rendering process on the decoded display-screen data and display the results of the picture-rendering process on their own display screens. Subsequently, at the following steps S710-1, 2, . . . and n, upon completion of the picture-rendering process, the reception-side terminals 10b each generate a ready-for-reception signal and, at the following steps S712-1, 2, . . . and n, transmit the signal to the transmission-side terminal 10a.

As a result, at steps S714-1, 2, . . . and n, the transmission-side terminal 10a receives the ready-for-reception signal with different timings. Then, at the next step S716, at the point of time the ready-for-reception signals have been received from all the reception-side terminal 10b, the transmission-side terminal 10a puts the search process in an executable state.

To put it in more detail, even after receiving the ready-for-reception signal from the reception-side terminal 10b-1 having a relatively high speed at the step S714-1, the transmission-side terminal 10a keeps the search flag in the off status, inhibiting the search process. Furthermore, even after receiving the ready-for-reception signal one after another from the reception-side terminal 10b-n and so on at the step S714-n and the subsequent steps, the transmission-side terminal 10a still keeps the search flag in the off status, prohibiting the search process as before as long as there is still a reception-side terminal 10b from which the ready-for-reception signal has not been received. It is not until the reception of the ready-for-reception signal from the reception-side terminal 10b-2, that is, it is not until the step S714-2, that the transmission-side terminal 10a eventually turns on the search flag to put the next search process in an executable state.

Thus, the transmission-side terminal 10a is capable of searching and transmitting data of the next display screen at the pace of, for example, a reception-side terminal 10b having the smallest processing power and the lowest communication speed. In this way, all the reception-side terminals 10b are capable of sharing a display screen of the transmission-side terminal 10a with a high degree of reliability. In addition, some of the reception-side terminals 10b each having a small processing power and/or a low communication speed will not miss a display screen of the transmission-side terminal 10a or will have their buffers overflowed with data.

It is to be noted that, also in the case of this embodiment, the transmission right 7 can be transferred among a plurality of terminals 10. To put it concretely, in the typical configuration shown in FIG. 16, the transmission right 7 owned by the transmission-side terminal 10a can be transferred to any of the reception-side terminals 10b-1, 10b-2, . . . and 10b-n in order to reverse their functions. By making the transmission right 7 transferable among a plurality of terminals 10 as such, a display screen of any terminal 10 used by the presenter of the data conference can be shared by the other terminals 10, allowing the presenter to make a presentation for other participants of the conference. In addition, the present invention can be applied to a case in which the function of the presenter can be rotated among participants of the data conference sequentially.

In addition, it is also possible to provide a configuration in which, by granting the transmission right 7 to each of the terminals 10, for example, data of a display screen of any terminal 10 can be presented to other terminals 10. In such a configuration, display screens appearing on a plurality of transmission-side terminals 10a each having a transmission right 7 can be displayed on the display screens of the transmission-side terminals 10a and the reception-side terminals 10b at the same time. Thus, the data-conference system 1 is capable of keeping up with a case in which a plurality of participants in the data conference play the role of the presenter at the same time and keeping up with a discussion in which the participants show contents of presentation to each other.

As described above, in the first and second embodiments, the transmission-side terminal 10a is capable of searching a search-object area to detect an updated area and transmitting the display-screen data of the updated area to a reception-side terminal 10b only after receiving a ready-for-reception signal generated in response to display-screen data transmitted earlier to the reception-side terminal 10b. Thus, instead of playing the role of a master terminal on the transmission side to transmit data of a display screen on a one-sided basis, the transmission-side terminal 10a is not capable of searching a search-object area to detect an updated area and transmitting the display-screen data of the updated area to a reception-side terminal 10b until the reception-side terminal 10b enters a state of being ready to receive data of a next display screen. That is to say, the transmission-side terminal 10a is capable of dynamically controlling the interval between processes to search search-object areas for updated areas, the interval between processes to encode display-screen data of the updated areas and, hence, the interval between transmissions of encoded display-screen data in accordance with the traffic and communication speed of the network 5 as well as the reception-side conditions such as the reception power and reception state of the reception-side terminal 10b. To be more specific, the transmission-side terminal 10a is capable of searching a required search-object area to detect an updated area, encoding the display-screen data of the updated area into data of a proper frame rate and, hence, transmitting the encoded display-screen data at the frame rate with a high degree of efficiency. As a result, the transmission-side terminal 10a is capable of substantially reducing the number of processes to search search-object areas for updated areas and the amount of transmitted data obtained as a result of an encoding process.

In addition, if the area to serve as a search object is not the entire display screen but an area within the range of a window corresponding to an updating event, the reception-side terminal 10b requires only the display-screen data of a focused updated area of the updating event as display-screen data obtained as a result of an encoding process in the transmission-side terminal 10a instead of the data of the entire display screen. Thus, the transmission-side terminal 10a needs only to encode the display-screen data of an updated area as minimum data required for allowing the display screen of the transmission-side terminal 10a to be shared by a reception-side terminal 10b and transmit the decoded display screen data to the reception-side terminal 10b.

As a result, the transmission-side terminal 10a needs to carry out processing such as the process to search an area for an updated area, the process to encode the display-screen data of the updated area and the process to transmit the decoded display-screen data to a reception-side terminal 10b with a timing proper for the reception-side terminal 10b and, in addition, the amount of the display-screen data to be encoded and transmitted can be reduced to a required minimum. Accordingly, the load borne by the transmission-side terminal 10a to carry out the encoding and transmission processes can also be decreased considerably. To put it concretely, for example, the load borne by the CPU 102 employed in the transmission-side terminal 10a provided by the embodiments can be suppressed to about ¼ of the load borne by a CPU employed in the conventional terminal, which transmits the display-screen data of an updated area periodically.

In addition, it is also possible to substantially reduce the increase of the amount of traffic through the network 5 as an increase resulting from an operation carried out by the transmission-side terminal 10a playing the role of a master terminal to keep transmitting data of a display screen to a reception-side terminal 10b. Assume for example that a participant of a data conference browses a picture appearing on the display screen of the transmission-side terminal 10a placed at a remote location. In this case, if the inspection of a still picture obtained as a result of a picture-rendering process is more important than the progress of the picture-rendering process itself, the amount of traffic through the network 5 can be reduced properly.

Furthermore, display-screen data of an amount exceeding the processing power or a reception-side terminal 10b is never transmitted to the reception-side terminal 10b. Thus, a reception-side terminal 10b is never overloaded even if the reception-side terminal 10b has a small processing power. As a result, an overflow never occurs in a buffer employed in the reception-side terminal 10b and completion of processing such as the reception process is never delayed considerably.

So far, the preferred embodiments of the present invention have been described by referring to diagrams. However, the scope of the present invention is not limited to the embodiments. It is obvious that a person skilled in the art is capable of contriving a variety of modified and/or corrected versions of the embodiments as versions within technological concepts described in claims appended to this specification. However, such modified and/or corrected versions naturally fall in the technological range of the present invention.

For example, in the embodiments described above, the display-screen-sharing system and display-screen-sharing method provided by the present invention are applied to the data-conference system 1 and the data-conference method adopted in the data-conference system 1 respectively. However, the scope of the present invention is not limited to such an application. For example, the display-screen-sharing system provided by the present invention can also be applied to a monitoring camera system in which data of a monitored picture displayed on a transmission-side terminal 10a located in close proximity to an object of monitoring is typically shared by a remote reception-side terminal 10b. Typically, the transmission-side terminal 10a is a terminal placed in a watchman room in the field whereas the reception-side terminal 10b is a terminal placed at the headquarters of a security-service company.

In addition, in the data-conference system 1 implemented by the embodiments described above, various kinds of data are exchanged directly between a transmission-side terminal 10a and a reception-side terminal 10b by way of the network 5. However, the scope of this present invention is not limited to such a configuration. For example, the data-conference system 1 can also be provided with a center server not shown in the figures between the transmission-side terminal 10a and reception-side terminals 10b to form a network system of a client/server type. In such a network system, the transmission-side terminal 10a and reception-side terminals 10b each serve as a client. In this case, the center server may carry out all or some of the various processes described above on data of a display screen and a ready-for-reception signal.

Furthermore, the search unit 130 searches a search-object area set in window units. However, the scope of this present invention is not limited to such a configuration. For example, the search unit 130 may also carry out an entire-area search process to always search the entire area of a display screen or a specific-area search process to always search specific area of the display screen. In addition, the shape of a search-object area is not necessarily rectangular as is the case with the search-object area described above. For example, the shape of a search-object area can be any one of a variety of forms such as a polygon and a circle.

Moreover, in the embodiments described above, a reception-side terminal 10b generates a ready-for-reception signal at a point of time a picture-rendering process carried out on received data of a display screen is completed, and transmits the signal to the transmission-side terminal 10a. However, the scope of this present invention is not limited to such a configuration. For example, a reception-side terminal 10b may also generate a ready-for-reception signal at a point of time a process to receive data of a display screen is completed, and transmit the signal to the transmission-side terminal 10a. In this case, a signal indicating completion of transmission and reception processes in a TCP/IP network is generally used as the ready-for-reception signal.

In addition, the embodiments each have a configuration in which the transmission right 7 can be transferred between the transmission-side terminal 10a and a reception-side terminal 10b. However, the scope of this present invention is not limited to such a configuration. For example, it is also possible to provide a configuration in which only a terminal 10 used by the presenter is allowed to own the transmission right 7 and the other terminals 10 each function only as a reception-side terminal 10b all the time.

Furthermore, in the case of the second embodiment, the transmission-side terminal 10a puts the search process in an executable state at a point of time a process to receive ready-for-reception signals from all the reception-side terminals 10b is completed. However, the scope of this present invention is not limited to such a configuration. For example, it is also possible to provide a configuration in which the transmission-side terminal 10a puts the search process in an executable state at a point of time a ready-for-reception signal is received from a specific reception-side terminal 10b or a point of time a process to receive ready-for-reception signals from at least a predetermined number of reception-side terminals 10b is completed.

What is claimed is:

1. A display-screen-sharing system, which comprises one or more transmission-side terminals, one or more reception-side terminals as well as a network for connecting said transmission-side terminals to said reception-side terminals and allows display-screen data of said transmission-side terminals to be shared by said reception-side terminals, wherein:

each of said transmission-side terminals comprises:
a search execution unit for carrying out a search process on a search-object area on a display screen to detect an updated area of said display when a search flag is set,
wherein when the search flag is in an ON state the search execution unit is placed into an executable state,
wherein when the search flag is in an OFF state the search execution unit is placed into a waiting state, and
wherein the updated area includes updated information caused by an updating event, which includes an operation carried out by a user at the transmission-side terminals and activation of multiple kinds of software;
a transmission-side transmission/reception unit for encoding at least display-screen data of said updated area and for transmitting at least the encoded display-screen data of said updated area to said reception-side terminals; and
a search-process control unit for putting said search process in a state of being unexecutable by said search execution unit in accordance with completion of transmission of said display-screen data;

every individual one of said reception-side terminals has a reception-side transmission/reception unit for receiving said display-screen data from any of said transmission-side terminals and transmitting a ready-for-reception signal to any of said transmission-side terminals transmitting said display-screen data as a signal indicating that said individual reception-side terminal has already entered a state of being ready to receive further display-screen data;

said transmission-side transmission/reception unit receives said ready-for-reception signal; and said search-process control unit puts said search process in a state of being executable by said search execution unit in accordance with completion of reception of said ready-for-reception signal.

2. A display-screen-sharing system comprising a plurality of terminals connected to each other by a network so as to allow display-screen data of one or more of said terminals each having a transmission right to be shared by one or more of said reception-side terminals, wherein:

each of said terminals each having said transmission right comprises:

a search execution unit for carrying out a search process on a search-object area on a display screen to detect an updated area of said display screen when a search flag is set, wherein when the search flag is in an ON state the search execution unit is placed into an executable state, wherein when the search flag is in an OFF state the search execution unit is placed into a waiting state, and wherein the updated area includes updated information caused by an updating event, which includes an operation carried out by a user at the transmission-side terminals and activation of multiple kinds of software;

a transmission-side transmission/reception unit for encoding at least display-screen data of said updated area and for transmitting at least the encoded display-screen data of said updated area to said other terminals; and a search-process control unit for puffing said search process in a state of being unexecutable by said search execution unit in accordance with completion of transmission of said display-screen data;

every individual one of said other terminals has a reception-side transmission/reception unit for receiving said display-screen data from any of said terminals each having said transmission right and transmitting a ready-for-reception signal to any of said terminals each having said transmission right and transmitting said display-screen data as a signal indicating that said other individual terminal has already entered a state of being ready to receive further display-screen data;

said transmission-side transmission/reception unit receives said ready-for-reception signal; and said search-process control unit puts said search process in a state of being executable by said search execution unit in accordance with completion of reception of said ready-for-reception signal.

3. A transmission-side terminal allowing display-screen data to be shared by one or more reception-side terminals connected to said transmission-side terminal by a network, said transmission-side terminal comprising:

a search execution unit for carrying out a search process on a search-object area on a display screen to detect an updated area of said display screen when a search flag is set, wherein when the search flag is in an ON state the search execution unit is placed into an executable state, wherein when the search flag is in an OFF state the search execution unit is placed into a waiting state, and wherein the updated area includes updated information caused by an updating event, which includes an operation carried out by a user at the transmission-side terminals and activation of multiple kinds of software;

a transmission-side transmission/reception unit for encoding at least display-screen data of said updated area and for transmitting at least the encoded display-screen data of said updated area to said reception-side terminals; and a search-process control unit for putting said search process in a state of being unexecutable by said search execution unit in accordance with completion of transmission of said display-screen data, wherein:

said transmission-side transmission/reception unit receives a ready-for-reception signal from every individual one of said reception-side terminals as a signal indicating that said individual reception-side terminal has already entered a state of being ready to receive further display-screen data; and said search-process control unit puts said search process in a state of being executable by said search execution unit in accordance with completion of reception of said ready-for-reception signal.

4. The transmission-side terminal according to claim 3, said transmission-side terminal further comprising:

an event-monitoring unit for detecting an updating event, which updates said display screen, and generating information on a range of a window included in said display screen as a window associated with said detected updating event; and a search-object-area management unit for setting said search-object area on the basis of said information on a range of a window.

5. The transmission-side terminal according to claim 4 wherein:

when said search-process control unit has already put said search process in a state of being unexecutable by said search execution unit, said search-object-area management unit stocks said set search-object area on a search list; and after said search-process control unit puts said search process in a state of being executable by said search execution unit by, said search execution unit carries out said search process on one or more search-object areas stocked on said search list.

6. The transmission-side terminal according to claim 5 wherein said search-object-area management unit adjusts one or more search-object areas already stocked on said search list in order to prevent portions of said search-object areas from overlapping each other.

7. A transmission-side terminal according to claim 3 wherein said search-process control unit puts said search process in a state of being executable by said search execution unit in accordance with completion of reception of said ready-for-reception signals from all said reception-side terminals.

8. A non-transitory computer-readable storage medium for storing a program for a display-screen-sharing method executed by a transmission-side terminal to at least allow display-screen data of said transmission-side terminal to be shared by one or more reception-side terminals connected to said transmission-side terminal by a network, said program comprising:

a search execution step of carrying out a search process on a search-object area on a display screen to detect an updated area of said display screen when a search flag is set,
wherein when the search flag is in an ON state the search execution unit is placed into an executable state,
wherein when the search flag is in an OFF state the search execution unit is placed into a waiting state, and
wherein the updated area includes updated information caused by an updating event, which includes an operation carried out by a user at the transmission-side terminals and activation of multiple kinds of software;

a transmission-side transmission/reception step of encoding at least display-screen data of said updated area and transmitting at least the encoded display-screen data of said updated area to said reception-side terminals;

a search-process control step of putting said search process in a state of being unexecutable at said search execution step in accordance with completion of transmission of said display-screen data, a transmission-side transmission/reception step of receiving a ready-for-reception signal from every individual one of said reception-side terminals as a signal indicating that said individual reception-side terminal has already entered a state of being ready to receive further display-screen data; and a search-process control step of putting said search process in a state of being executable at said search execution step in accordance with completion of reception of said ready-for-reception signal.

9. A display-screen-sharing method for allowing at least display-screen data of an updated area of one or more transmission-side terminals to be shared by one or more reception-side terminals connected to said transmission-side terminals by a network, said display-screen-sharing method comprising the steps of:

driving any of said transmission-side terminals to carry out a search process on a search-object area of a display screen to detect an updated area of said display screen when a search flag is set,
wherein when the search flag is in an ON state the search execution unit is placed into an executable state,
wherein when the search flag is in an OFF state the search execution unit is placed into a waiting state, and
wherein the updated area includes updated information caused by an updating event, which includes an operation carried out by a user at the transmission-side terminals and activation of multiple kinds of software;

driving any of said transmission-side terminals to encode at least display-screen data of said updated area;

driving any of said transmission-side terminals to transmit at least the encoded display-screen data of said updated area to said reception-side terminals and putting said search object in an unexecutable state, driving every individual one of said reception-side terminals to receive said display-screen data from any of said transmission-side terminals and transmit a ready-for-reception signal to any of said transmission-side terminals transmitting said display-screen data as a signal indicating that said individual reception-side terminal has already entered a state of being ready to receive further display-screen data;

driving every individual one of said reception-side terminals to decode the received display-screen data of the updated area, which is encoded by the transmission-side terminals; and driving any of said transmission-side terminals to receive said ready-for-reception signal and putting said search object in an executable state.

10. A display-screen-sharing method according to claim 9, said display-screen-sharing method further including the step of driving any of said transmission-side terminals to:

detect an updating event, which possibly updates said display screen, and generating information on a range of a window included in said display screen as a window associated with said detected updating event; and set said search-object area on the basis of said generated information on a range of a window.

11. The display-screen-sharing method according to claim 10 wherein said step of driving any of said transmission-side terminals to set said search-object area further comprises the steps of:

stocking said set search-object area on a search list if said search process has already been put in a state of being unexecutable; and carrying out said search process on one or more search-object areas stocked on said search list if said search process has already been put in a state of being executable.

12. A display-screen-sharing method according to claim 11 wherein said step of setting said search-object area further includes the step of adjusting a plurality of search-object areas already stocked on said search list in order to prevent portions of said search-object areas from overlapping each other.

13. A display-screen-sharing method according to claim 9 whereby, at said step of putting said search object in an executable state, said search object is put in an executable state in accordance with completion of reception of said ready-for-reception signals from all said reception-side terminals.

14. A display-screen-sharing method according to claim 9, said display-screen-sharing method further having the step of driving each of said reception-side terminals to:

carry out a picture-rendering process on said display-screen data received from any of said transmission-side terminals; and generate said ready-for-reception signal upon completion of said picture-rendering process.

* * * * *